US012332059B2

(12) United States Patent
Adegbenro

(10) Patent No.: US 12,332,059 B2
(45) Date of Patent: Jun. 17, 2025

(54) METHOD AND SYSTEM FOR INDOOR POSITIONING AND IMPROVING USER EXPERIENCE

(71) Applicant: Adeleke Adewunmi Adegbenro, Stone Ridge, VA (US)

(72) Inventor: Adeleke Adewunmi Adegbenro, Stone Ridge, VA (US)

( * ) Notice: Subject to any disclaimer, the term of this patent is extended or adjusted under 35 U.S.C. 154(b) by 387 days.

(21) Appl. No.: 17/838,224

(22) Filed: Jun. 12, 2022

(65) Prior Publication Data
US 2022/0397400 A1    Dec. 15, 2022

Related U.S. Application Data

(60) Provisional application No. 63/210,053, filed on Jun. 13, 2021.

(51) Int. Cl.
| | |
|---|---|
| G01C 21/20 | (2006.01) |
| G06F 16/29 | (2019.01) |
| G06Q 30/0601 | (2023.01) |
| G06T 17/00 | (2006.01) |
| H04W 4/029 | (2018.01) |
| H04W 4/33 | (2018.01) |
| H04W 84/12 | (2009.01) |

(52) U.S. Cl.
CPC ........... *G01C 21/206* (2013.01); *G06F 16/29* (2019.01); *G06Q 30/0631* (2013.01); *G06T 17/00* (2013.01); *H04W 4/029* (2018.02); *H04W 4/33* (2018.02); *G06T 2200/24* (2013.01); *H04W 84/12* (2013.01)

(58) Field of Classification Search
CPC ...... G01C 21/206; H04W 4/33; H04W 4/029; H04W 84/12; G06F 16/29; G06T 17/00; G06T 2200/24

USPC ......................................................... 701/434
See application file for complete search history.

(56) References Cited

U.S. PATENT DOCUMENTS 9,142,051 B2 *   9/2015  Kwak ..................... G06T 11/60
9,204,257 B1 *  12/2015  Mendelson ........... H04W 4/024
(Continued)

FOREIGN PATENT DOCUMENTS

| CN | 101854384 A | 10/2010 |
|---|---|---|
| CN | 105611502 B | 12/2018 |

*Primary Examiner* — Yazan A Soofi
(74) *Attorney, Agent, or Firm* — Howard University School of Law; Lyssa-Michelle Morris

(57) ABSTRACT

Methods and systems provide a computer technologic enhanced experience to a user when the user visits an indoor environment. A method may include computer readable instructions for identifying and tracking the user in the indoor environment using an indoor positioning system. An indoor positioning system may include a leaky feeder cable network, a plurality of Wi-Fi access points and location tracking using triangulation and Tine-to-Flight calculations. Further, based on the tracking of the user, the user is provided with an augmented navigation route for navigating in the indoor environment. The optimized navigation route is displayed on a virtual 3D model of the indoor environment. Further, the method comprises providing augmented item list to the user while navigating in the indoor environment, such that the augmented item list is generated via the use of advanced analytics, AI/Machine learning capabilities and computer vision based machine learning model for object tracking and recognition.

20 Claims, 18 Drawing Sheets

(56) References Cited

U.S. PATENT DOCUMENTS

2019/0340876 A1* 11/2019 Northrup ............ G07F 17/3241
2021/0374836 A1* 12/2021 Bronicki ............ G06Q 30/0201
2022/0026519 A1* 1/2022 Wu ..................... G01S 7/006

* cited by examiner

METHOD AND SYSTEM FOR INDOOR POSITIONING AND IMPROVING USER EXPERIENCE

CROSS-REFERENCE TO RELATED APPLICATIONS

This application claims priority to provisional application App. No. 63/210,053 filed Jun. 13, 2021 the contents are incorporated by reference herein.

TECHNOLOGICAL FIELD

Example embodiments of the present disclosure generally relate to indoor positioning and navigational systems, and more particularly relate to a method and a system for optimizing a user experience using indoor positioning and navigational technologies.

BACKGROUND

Indoor positioning is known for locating a user in indoor environments where GPS cannot reach. Indoor positioning can be performed, for example, by locating a device, for example, a smart device associated with a user. Conventional indoor positioning is done with the help of sensors, such as geomagnetic devices, sonar, Bluetooth, lasers, and the like. However, such devices lack in locating the real-time location/position of the user (or of the device associated with the user) efficiently, for example, in terms of accuracy and overall cost.

Further, nowadays, many smart applications require real-time locations of the user, for enhanced indoor positioning. However, such real-time locations are not achievable by most of the conventional indoor positioning systems precisely.

Therefore, there is a need to provide a solution to overcome the above-mentioned limitations. Further, there is a need for providing accurate indoor positioning integrated with enhanced user experience.

SUMMARY

Various aspects provide a method and a system for providing indoor positioning capabilities for enhanced user experiences. In some aspects, the enhanced user experiences are related to shopping related services, indoor navigation related services in facilities such as airports, hotels, hospitals, large educational institutions, government buildings, trade shows, conferences, and the like. Some shopping related services may be related to intelligent shopping list creation and optimization, retail store route generation and optimization based on shopping list, retail payment and contactless checkout, shopping list reconciliation, theft detection in retail and/or indoor environments and the like. For example, the method and the system may relate to an application that provides the user with a capability to scan a QR code at the entrance of a store (for e.g.—a retail store), and thereafter entering the store, picking an item of their choice, and going out of the store.

Some aspects are related to methods and systems for creating a prioritized and optimized item list for the user. Various aspects provide an optimized navigational route for the user in an indoor environment, such as in a retail store.

According to some aspects, a system for providing enhanced user experience is provided. The system comprises an indoor positioning system, comprising a transmission infrastructure comprising a network of leaky feeder cables and a position detection infrastructure comprising a plurality of Wi-Fi access points. The position detection infrastructure is configured to detect position of at least one user device based on: a unique identifier associated with the user device, the network of leaky feeder cables and the plurality of Wi-Fi access points. The position detection infrastructure is communicatively couple to at least one processor configured to perform calculations associated with a triangulation operation and a time-of-flight detection operation. Further, the system comprises an output unit, for outputting the detected position of the at least one user device to provide the enhanced user experience. Additionally, the system comprises at least one processor configured to execute computer executable instructions to: generate an item list for a user, the item list comprising one or more items arranged in an order based on at least one of a priority criterion and an optimization criterion; determine, real-time location data of a user device associated with the user, in the indoor environment; obtain, based on the real-time location data, information associated with the indoor environment; output, a virtual 3-D model of the indoor environment based on the real-time location data of the user device and the information related to the indoor environment; and generate output data for the user based on the real-time location data of the user device, the generated item list and the virtual 3-D model, for providing the enhanced user experience to the user.

In some aspects, the system is configured to create, prioritize, and optimize the item list of the user of a portable device in the indoor environment, and further to optimize the navigational route of the user is provided. The system includes a memory storing executable instructions and a processor configured to execute the stored executable instructions.

According to some aspects, a method for providing enhanced user experience in an indoor environment is provided. The method comprising: generating an item list for a user, the item list comprising one or more items arranged in an order based on at least one of a priority criterion and an optimization criterion; determining, by a processor, real-time location data of a user device associated with the user, in the indoor environment; obtaining, based on the real-time location data, information associated with the indoor environment; outputting, by the processor, a virtual 3-D model of the indoor environment based on the real-time location data of the user device and the information related to the indoor environment; and generating output data for the user based on the real-time location data of the user device, the generated item list and the virtual 3-D model, for providing the enhanced user experience to the user.

According to some aspects, a computer programmable product may be provided. The computer programmable product comprises a non-transitory computer readable medium having stored thereon computer executable instructions which when executed by one or more processors, cause the one or more processors to carry out operations, the operations comprising: for providing enhanced user experience in an indoor environment, the method comprising: generating an item list for a user, the item list comprising one or more items arranged in an order based on at least one of a priority criterion and an optimization criterion; determining, real-time location data of a user device associated with the user, in the indoor environment; obtaining, based on the real-time location data, information associated with the indoor environment; outputting, a virtual 3-D model of the indoor environment based on the real-time location data of the user device and the information related to the indoor environment; and generating output data for the user based on the real-time location data of the user device, the generated item list and the virtual 3-D model, for providing the enhanced user experience to the user.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
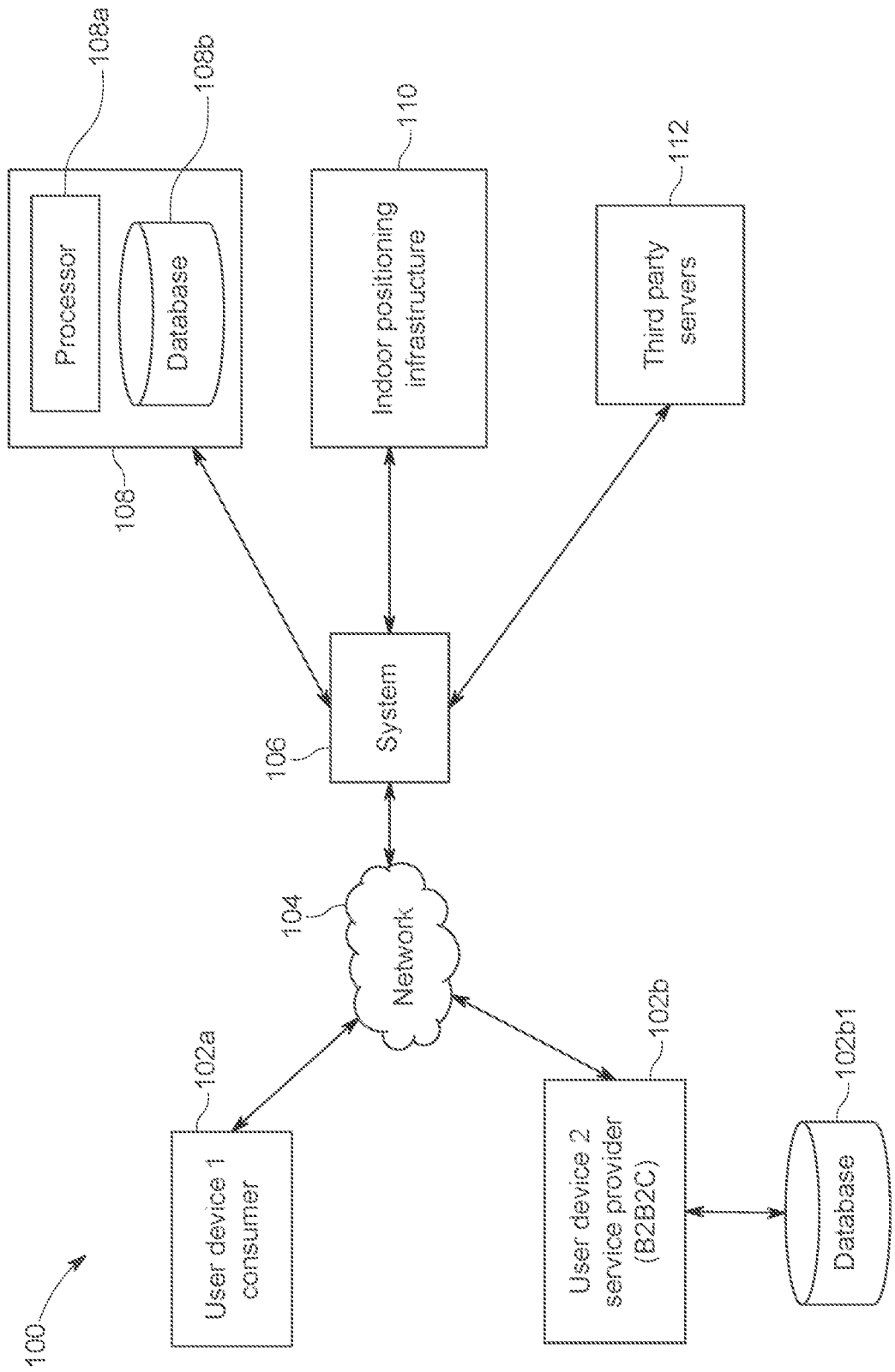
FIG. 1 illustrates a block diagram of an environment representation for a system for providing enhanced user experience, in accordance with an example embodiment of the present disclosure.

In the following description, for purposes of explanation, numerous specific details are set forth in order to provide a thorough understanding of the present disclosure. It will be apparent, however, to one skilled in the art that the present disclosure may be practiced without these specific details.

Throughout the following description, numerous references may be made regarding servers, services, or other systems formed from computing devices. It should be appreciated that the use of such terms is deemed to represent one or more computing devices having at least one processor configured to or programmed to execute software instructions stored on a computer readable tangible, non-transitory medium or also referred to as a processor readable medium. For example, a server can include one or more computers operating as a web server, data source server, a cloud computing server, a remote computing server or other type of computer server in a manner to fulfill described roles, responsibilities, or functions. Within the context of this document, the disclosed modules are also deemed to comprise computing devices having a processor and a non-transitory memory storing instructions executable by the processor that cause the device to control, manage, or otherwise manipulate the features of the devices or systems.

The aspects are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

The present disclosure is directed towards providing an enhanced user experience for various services accessed an indoor environment. The various services may include mobile device-based services that may be accessed by a user having or carrying the mobile device in the indoor environment. These services may include such as shopping related services, navigation related services, payment and checkout related services, search and find services, marketing and promotion related services, communication related services and the like. Generally, when the mobile device is used in an outdoor environment, these various services are accessed using wireless communication networks, such as internet, and the provision of these services and user experience in availing these services is gauged by parameters like seamless connectivity, ease of access, intuitiveness of user interfacing technologies and the like. However, when the same services are accessed in the indoor environment, seamless connectivity becomes a big challenge due to poor reception and attenuation of wireless signals in the shielded spaces of the indoor environment. This in turn becomes a hindrance in provision other user experience enhancement services.

One such user experience enhancement service is reducing of time and cost in provision of these services to the user while the user is in the indoor environment. This may be achieved by providing optimization services, such as optimized navigation, optimized shopping, optimized payment processing and optimized checkout/delivery while accessing a service in the indoor environment. Various aspects disclosed herein provide for optimized service provision, especially in indoor environments, using an improved indoor positioning infrastructure and technology, coupled with enhanced service optimization using artificial intelligence-based technologies for performing enhanced analytics and optimizations.

Some aspects are based on the realization that provision of enhanced user experience services through the mobile device comprises providing an optimized path to the user to navigate within the indoor environment. This may be achieved by providing a virtual 3D model of the indoor environment to the user, which improves user experience while navigation. Further, when the indoor environment is a retail environment, the optimization may also provide more accurate navigation assistance based on shopping needs of the user. For example, a busy urban mom who goes to a retail store for grocery shopping, needs to be able to quickly pick the items on her shopping list, pay for them without waiting, and leave. These needs may be catered to by the methods and systems disclosed herein by providing enhanced user experiences, based on an improved indoor positioning and navigation system. The user (for example, the urban busy mom in this case) gets to spend more time with family, saves money and performs easy and more efficient navigation in the indoor environment which further reduces the stress of the user.

The methods and systems disclosed herein provide "seamless" indoor navigation without experiencing any kind of discontinuities and delays by the user, which are generally encountered in indoor environments. Such advantages are crucial in specific indoor environments which are shielded or underground, such as basements, underground metro stations and the like. This is enabled by an enhanced indoor positioning system which uses a network of leaky feeder cables, indoor Wi-Fi access points and Time of Flight (ToF) techniques to provide better location tracking without issues encountered in conventional applications based on indoor positioning systems known in the art. Such advantages of the present disclosure are rendered possible by using the accurate indoor positioning system discussed in conjunction with various aspects.

Some aspects are based on the recognition that the user may use a user equipment or a mobile device (referred to equivalently hereinafter) to access the enhanced indoor positioning and navigation system for better user experience. To that end, the user equipment may include an application (or "app") for accessing the various enhanced user experience related services. To that end, the app may be configured to provide services including, but not limited to, shopping list generation and optimization, indoor navigation, optimized payment processing, route assistance, automated checkout, advanced analytics based on artificial intelligence (AI), shopping list reconciliation and the like.

Some aspects are further based on the realization that the app may also be configured for use by a service provider, such as an owner of the indoor environment. To that end, the app may be configured for providing enhanced user experience to a second type of user associated with the service provider. This second type of user may be such as a salesman, a floor manager, an employee, or any other such user associated with the service provider. The app is configured to provide a different user interface to second type of user for providing enhanced user experiences. These enhanced user experiences may include such as optimized floor management, efficient customer/user tracking, better inventory management, enhanced security, theft management and the like. It may be understood by a person of ordinary skill in the art, that irrespective of the type of user using the app, the systems and methods disclosed herein enable the app to provide enhanced user experiences, by using a combination of the indoor positioning system and AI based enhanced analytics and optimization technologies disclosed herein.

Indoor positioning systems can most easily be explained as positioning systems equivalent in function to Global Positioning System (GPS), but specifically meant for indoor locations. It is a technology that allows users to accurately pinpoint the location of people, devices, or assets inside an indoor environment, such as retail stores, tunnels, airports, hospitals, metro stations, conferences in buildings such as hotels, and the like. The indoor positioning systems may be accessed using portable devices such as smartphones, mobile devices, tracking tags or other devices. The indoor positioning systems are accessed using the user equipment or portable devices discussed above, by accessing the app installed on the user equipment. In one aspect of the present disclosure, indoor positioning is performed to locate the user equipment associated with the user. The user equipment includes, for example, smartphones, wearable devices, medical devices, shopping carts, or any other device having computing capabilities and capable of being transportable by the user in the indoor environment.

Without limiting the scope of the present disclosure, the indoor environment may be a retail store, an airport, a hospital, a large exhibition area, a conference, a restaurant facility, a gym facility, an educational institution such as indoor facilities of a university campus and the like. In one embodiment of the present disclosure, optimizing of time, cost, and overall experience of the user of the user equipment when the user visits the indoor environment is envisaged. Such optimization is possible, for example, by providing optimized navigational route to the user so that the user performs the desired tasks in an efficient manner in any indoor environment using the methods and systems disclosed herein.

To that the end, the present disclosure provides methods and systems that may enable consumers from the app that facilitates provision of enhanced and optimized user experiences in indoor environments. Further, the present disclosure also provides methods and systems that may enable software development firms in building an enhanced and optimized consumer application that uses artificial intelligence, computer vision and machine learning technology; as well as an efficient and cost-saving indoor positioning system for real-time location tracking and navigation.

Some aspects are based on the recognition that the methods and systems disclosed hereon provide enhanced user experiences by improving personal economic management, security, and health activities, including generation of optimized consumer shopping lists and retailer checkout processes, and improving the consumer shopping experience by making it more time efficient and safer for users.

Various aspects disclosed herein provide a cost-effective indoor positioning system that is based on re-configuration of existing self-checkout kiosks in most retail stores by retrofitting them with high-speed cameras, thereby providing huge infrastructural cost and time to implement savings. Further, the use of artificial intelligence, computer vision and machine learning help to improve the accuracy, efficiency, and price of the system for providing enhanced user experience.

FIG. 1 illustrates a block diagram of an environment 100 representation for a system 106 for providing enhanced user experience, in accordance with an example embodiment of the present disclosure. The environment 100 may be an indoor environment, such as indoors of a shopping mall, airport, hospitals, library, and the like. As illustrated in FIG. 1, the environment 100 comprises one or more user devices 102a, 102b that may be configured to access the system 106 via a network 104. The system 106 is further configured to be coupled communicatively to a remote server 108, wherein the remote server 108 comprises a processor 108a for performing various operations and a storage module/a database 108b for storing data associated with the services provided by the remote server 108, an indoor positioning infrastructure 110 and one or more third party servers 112.

The system 106 may be accessed by the one or more user devices 102a, 102 by configuring an application (or "app") on each of the user devices 102a and 102b, such as by downloading the app from the remote server 108. To that end, the remote server 108 may be any of a cloud based sever, a web server, a virtual server, an application server, and the like. The one or more user devices 102a, 102b may be configured to access the system 106 for downloading or for use when not in any indoor environment, through the network 104.

The network 104 may be any of a wired, wireless, or any combination of wired and wireless communication networks such as internet, local area network (LAN), wide area network (WAN), Wi-Fi network, cellular network, and the like. The network 104 may comprise suitable logic, circuitry, and interfaces that may be configured to provide a plurality of network ports and a plurality of communication channels for transmission and reception of data. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 104 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 104 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long-Term Evolution (LTE) network, a plain old telephone service (POTS), and a Metropolitan Area Network (MAN). Additionally, the wired channel may be selected based on bandwidth criteria. For example, an optical fiber channel may be used for a high bandwidth communication. Further, a coaxial cable-based or Ethernet-based communication channel may be used for moderate bandwidth communication.

The network 104 may be accessed by the one or more user device 102a, 102b when these user devices in outdoor environment or in an environment not having the indoor positioning infrastructure 110. To that end, the user device 102a may be a consumer's user device and the user device 102b may be a service provider's user device. The service provider may be such as a business-to-business-to-consumer service provider, like a retail store, a mall, a shopping facility, a conference facility, and the like. In some aspects, the data about the service provider may be accessed from a service provider's database 102b1. This data may include information about the indoor environment such as data or information about internal structure of the indoor environment facility of the service provider including details such as flooring plan, shelving plan, inventory store location, kiosk/checkout terminal location, item return information, product placement within the indoor environment, locations of various facilities like restrooms, water tanks and the like. These may be accessed by the system 106 for generating a virtual 3D model of the indoor environment, which may in turn be used for providing optimized navigation in the indoor environment, by using the indoor positioning infrastructure 110.

The indoor positioning infrastructure 110 may include a network of leaky feeder cables, Wi-Fi access points and real-time triangulation of the user device 102a using Time-of-Flight (ToF) techniques for providing enhanced indoor navigation services to the user by usage of the system 106.

The system 106 may also be configured to interface with one or more third party servers 112, such as banking servers, outdoor mapping applications, social networking applications, e-commerce websites and the like to access user' data and use it for advanced analytics and optimization services provided using the remote server 108 associated with the system 106.

The remote server 108 comprises the processor 108a for carrying out one or more operations that enable the system 106 to provide enhanced user experience services including but not limited to optimized indoor navigation, optimized shopping list generation, automated checkout, automated payment processing, shopping list reconciliation, theft management, dynamic inventory/stock replenishment using up-to-date floor plans, and the like.

The remote server 108 also comprises the storage module/the database 108b for storing data associated with various operations performed by the processor 108a. The database 108b may be configured to store data about the service provider. In some embodiment, the system 106 may access a service provider database 102b1, such as through API calls, to obtain data about the service provider which is required for provision of enhanced user experience by the system 106. This data may include information such as service provider's pricing data, data about floor plan of their indoor environment(s), discounts and promotional data, inventory data, shelving system/brand placement data, user loyalty data for each customer of the service provider, user purchase history data and the like. The data about the service provider may be made accessible to the system 106, through legal contractual agreements put in place before associating the system 106 with the service provider. Once the system 106 is configured for the service provider in the manner described above, processor 108a may be configured to perform various operations for providing enhanced user experience using the system 106.

The processor 108a may be embodied in several different ways. For example, the processor 108a may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

The database 108b may include a relational database, an operational database, a cloud-based database, a personal database, a commercial database, and the like. The database 108b may further store data accessed from the system 106, which may include a memory for storing the data. To that end, the system 106 may include a volatile and/or non-volatile memory. In other words, for example, the memory may be an electronic storage device (for example, a computer readable storage medium) comprising gates configured to store data (for example, bits) that may be retrievable by a machine (for example, a computing device like the processor 108a) or a processor associated with the system 106. The memory may be configured to store information, data, content, applications, instructions, or the like, for enabling the system 106 to carry out various functions in accordance with an example embodiment of the present invention. For example, the memory could be configured to buffer input data for processing by the system 106. The memory may also be configured to store instructions for execution by the processor associated with the system 106. In some example aspects, the memory may also be configured to store a pre-trained machine learning model for the system 106. To that end, system 106 may be embodied as a software system implemented on a computing device, such on a remote computer, such as the remote server 108, which comprises the memory and a processing component (like the processor 108a described above) which further comprises various modules for carrying out various instructions to provide specific functionalities implement by that module.

Figure 2A:
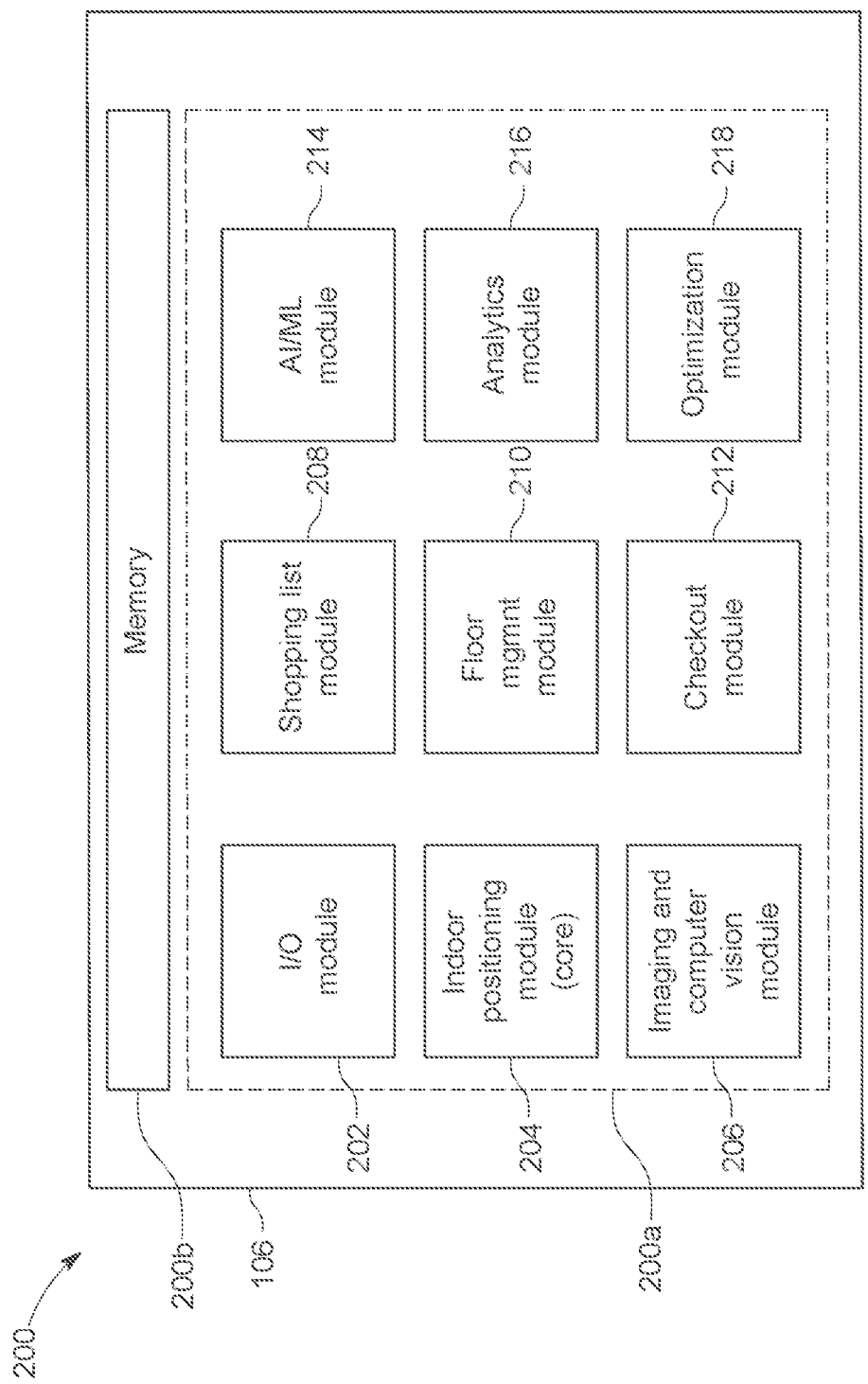
FIG. 2A shows a block diagram of the system of FIG. 1, in accordance with an example embodiment of the present disclosure.

FIG. 2A shows a block diagram 200 of the system 106 of FIG. 1, in accordance with an example embodiment of the present disclosure.

The system 106 comprises a processing module 200a and a memory 200b (already described in conjunction with FIG. 1). The processing module 200a and the memory 200b are analogous to the 108a and the database 108b respectively, as shown in FIG. 1. The memory 200b is configured to store various instructions which are carried out by the processing module 200a to provide functionality of an application or app configured to provide enhanced user experiences for various types of users. The processing module 200a is further implemented as a combination of various sub-modules, wherein each sub-module implements a specific functionality provided by the system 106.

As illustrated in the block diagram 200, the processing module 200a may comprise an I/O module 202, an indoor positioning module 204 which forms a core of the system 106, an imaging and computer vision module 206, a shopping list module 208, a floor management module 210, a checkout module 212, an AI/ML module 214, an analytics module 216, and an optimization module. Each module is configured to implement a specific functionality as will be described in the following description. It may be understood by one of ordinary skill in the art that the number and types of modules shown in FIG. 2A are for exemplary purpose only to represent a preferred embodiment of the present disclosure. However, any number of modules may be added or removed from the system 106 based on the specific requirements of the application area in which the system 106 is implemented. For example, an application for a hospital environment may not need to implement the specific functionalities of the shopping list module 208, and thus, the specific operations performed by the shopping list module 208 may either not be defined or may be omitted at the time of execution of the operations/instructions by the processing module 200a. Thus, the system 106 may be modular, scalable, and easily adaptable to various kinds of application areas, without requiring substantial coding, reconfiguration, or computing efforts. The specific functionalities of each of the modules 202-218 are described below in a non-limiting manner.

Figure 3:
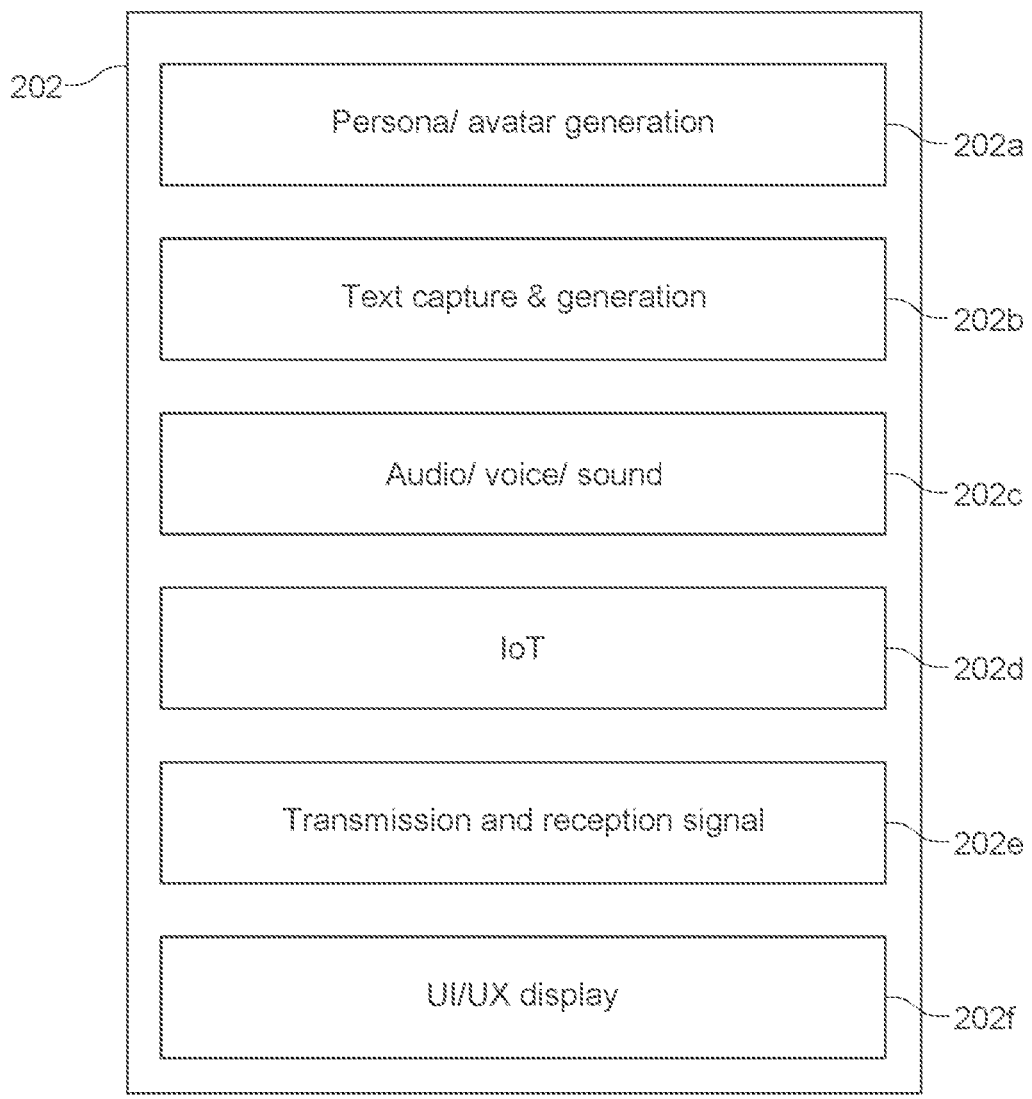
FIG. 3 shows a block diagram of an I/O module of the system of FIGS. 2A-B, in accordance with an example embodiment of the present disclosure.

The I/O module 202 is configured to provide interfacing mechanisms for the system 106 to interface with a user, such as the user device 102a or the user device 102b. The I/O module 202 may be configured to receive one or more user inputs using input technologies comprising: a touch-based input, a keyboard input, a pointing device such as mouse-based input, a trackball, a joystick, a voice-based input, an image-based input, and the like. The I/O module 202 may also be configured for providing output through one or more output technologies like a display or a speaker configured to generate an output based on operations performed by the processor 200a. The display may comprise an interactive display or any conventional static display having any known display technology such as an LED based display, an LCD display, an OLED display, an AMOLED display, an infrared display, and the like. The I/O module 202 further comprises various sub-modules as illustrated in FIG. 3. The various sub-modules may include a persona/avatar generation module 202a, a text capture and generation module 202b, an audio/video/sound module 202c, an Internet-of-Things (IoT) module 202d, and transmission and reception module 202e, and a UI/UX display module 202f.

The persona/avatar generation module 202a may be configured to provide an interactive I/O mechanism using a personalized avatar. The personalized avatar may comprise an interactive male avatar or an interactive female avatar based on an end-user's preference and may be configured to provide a natural and more human interaction experience for performing various types of input or for generating output in the form of different output functions by the user with the system 106. For example, an urban mom may select a female avatar for interacting with the system 106, such as app installed on her user device 102a, and then may interact with the female avatar like a friend, by providing voice inputs. For example, the urban mom may say, "Hi Jess! I need to buy bread, butter, Nutella, and eggs today. Please put them on my shopping list and remind me around noon". Thus, the urban mom gets a very personalized experience of using the app and does not have to arrange multiple things like a paper and a pen/pencil for noting down what to shop. They could always be on the move, and still compile their shopping list, and that too in a personalized, friendly, and supportive manner. However, there are other means to capture input from the user as well.

The text capture and generation module 202b may be configured like conventional text-based input mechanisms known in the art. These may include such as keyboard-based input, touch keypad for input, stylus/pen-based input for writing on the user device 102a or the user device 102b and the like. In some aspects, the text capture and generation module 202*b* also enables handwriting recognition for written text capture and recognition using related technologies like handwritten image capture, handwriting recognition, pattern matching and analysis, and digital list generation. For example, the user may have a sticky paper note or a writing pad on which they may have scribbled their shopping needs. The user device 102*a* may then be configured to capture the image of the scribbled text and then generate a digitalized form of the list for user's ready reference and for use within the system 106 for further processing (such as optimizations, budgeting, and the like).

The audio/voice/sound module 202*c* may be configured to enable the system 106 to provide or generate output in the form of voice or speech-based input and output capabilities. For example, the use may dictate their requirements, such as for generation of a shopping list, or for displaying a map for navigation, the user device 102*a* recognizes the user's voice, performs speech recognition, performs interpretation and analysis of the recognized speech to identify the action being asked for performing, and generates and output response based on the interpretation. The output response may then be provided in the form of a voice-based output, or by showing a display associated with the desired action to be performed. In the case of generation of a shopping list, a final list compiled by the system 106 based user's speech input may be displayed to the user.

The IoT module 202*d* may be configured to make use of one or more sensors associated with the user device 102*a* or 102*b*, as well as one or more sensors present in the environment around the user device 102*a* or 102*b* and the system 106 to perform automatic data recognition, analysis, and processing functions. For example, in a user's house, a smart refrigerator may be used. The smart refrigerator may be configured to keep checking the use and replenishment of items kept inside, and accordingly, may be configured to interact with the user device, such as the consumer device 102*a*, about which things from their daily grocery supply are running out. In a similar manner, for a service provider, there may be sensors installed on all racks or shelves in the service provider's indoor environment, which may keep monitoring the placement and occupancy status of each shelve. In case a shelve is running out of stock, the sensor-based data may be used by the IoT module 202*b* to provide alert to a user, such as an inventory manager for the service provider using the user device 102*b*, that the shelve needs to be refilled with inventory. Based on this, the inventory manager may take suitable action. To that end, the IoT module 202*b* may be configured to provided data for generating an item list for the user, such as a shopping list. The item list may include one or more items as detected based on stock or inventory monitoring of different shelves of the refrigerator as mentioned above.

The transmission and reception signal module 202*e* may be configured to enable exchange of communication signals between the computing device associated with the system 106 and one or more other entities, such as any of the user devices 102*a* or 102*b*, or the remote server 108, or the indoor positioning infrastructure 110 or the third party serves. To achieve this, the transmission and reception signal module 202 may comprise a communication interface including an antenna, which may be operatively coupled to a transmitter and a receiver (also collectively referred to hereinafter as a "transceiver"). The collection of the antenna and the transceiver may enable the transmission signal and reception module 202*e* to transmit and receive communication signals to and from the one or more other entities respectively, in accordance with any know communication protocols and standards. The communication signals may include signaling information in accordance with an air interface standard/protocol of the applicable cellular or other network system of which the system 106 may be a part.

The user interface (UI)/user experience (UX) display module 202*f* may be configured to provide an appropriate user interface to the access the system 106 based on the needs and requirements of the end user. For example, a consumer or household user may be displayed with different options on the user interface associated with the system 106, than a business user. The household user may access the system 106 via the app installed on their mobile device (such as the user device 102*a*) and may be shown options on the app which include: my profile, my account, shopping list, indoor navigation option, 3D map display, turn-by-turn navigation, budgeting, and the like. On the other hand, the business user may access the system 106 via the app installed on an in-store device (the user device 102*b*), or a kiosk. They may be displayed with options such as: order management, billing, item reconciliation, payment processing, inventory management, shelving display, floor display, user tracking, and the like. Thus, the system 106 may be able to provide a customizable user interface based on the type or category of the user, on the associated display device. This makes the system 106 to be suitable for use by a wide category or users, household users or business users, and being easily adaptable to each category without substantial computing effort expenditure.

The various sub-modules of the I/O module 202 may be configured based on user requirements to provide one or more of the functions described above. The other modules of the system 106 will now be described in detail as outlined below.

Figure 4:
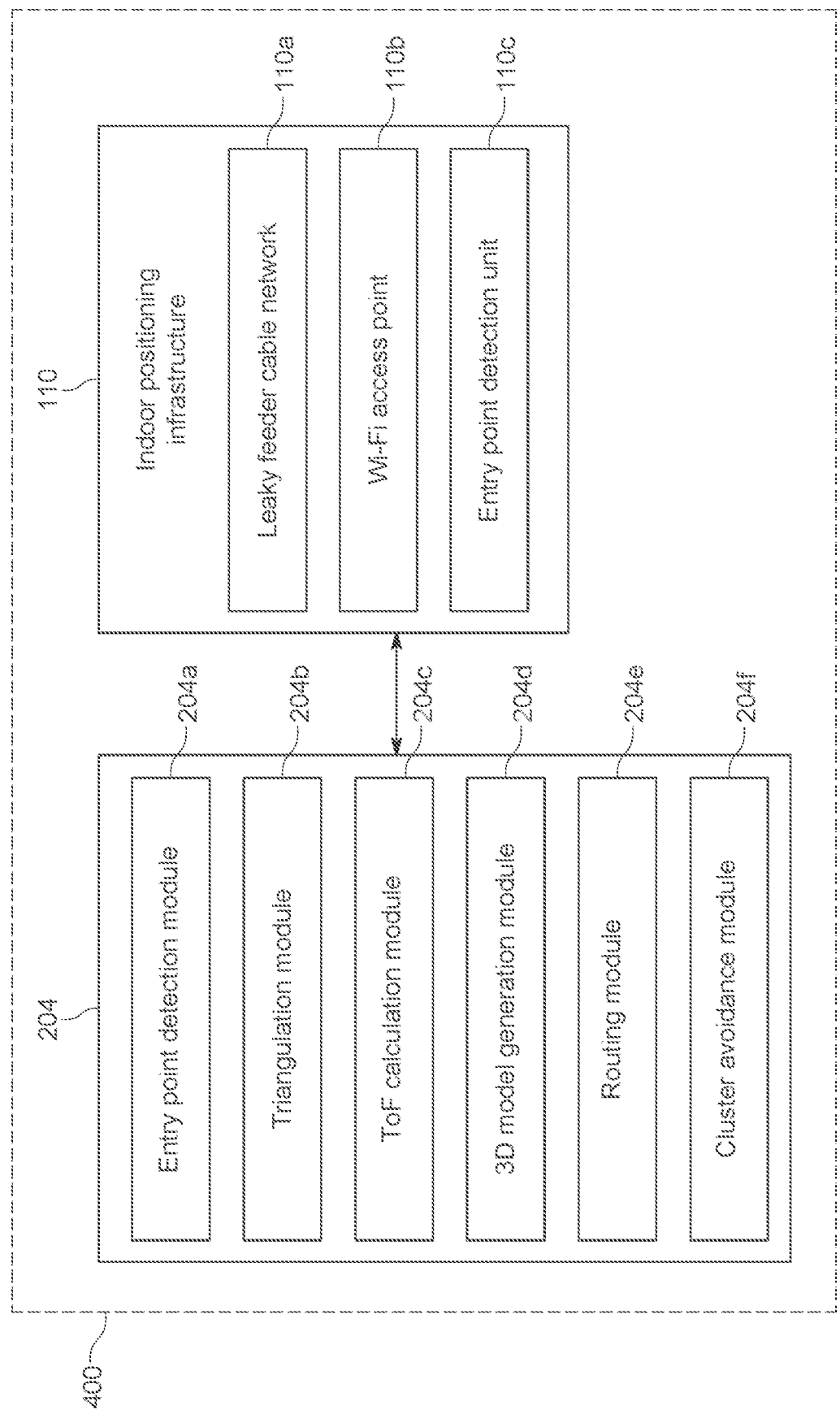
FIG. 4 shows a block diagram of interactions between the indoor positioning infrastructure and indoor positioning module of the system of FIGS. 2A-B, in accordance with an example embodiment of the present disclosure.

The system 106 also comprises the indoor positioning (core) system or module 204 which is configured to provide efficient indoor navigation via the system 106. The indoor positioning module 204 further comprises various sub-modules as illustrated in FIG. 4. The various sub-modules of the indoor positioning module 204 comprise an entry point detection module 204*a*, a triangulation module 204*b*, a time of flight (ToF) calculation module 204*c*, a 3D model generation module 204*d*, a routing module 204*e*, and a cluster avoidance module 204*f*. The indoor positioning module 204 may be communicatively coupled with the indoor positioning infrastructure 110 for providing enhanced user experience in an indoor environment, based on enhanced indoor navigation techniques provided by the combination of the indoor positioning module 204 and the indoor positioning infrastructure 110. The indoor positioning infrastructure 110 also comprises various components comprising a leaky feeder cable network 110*a*, one or more Wi-Fi access points 110, and an entry point detection unit 110*c* (analogous to but separate from the entry point detection module 204*a*). The details of the working of the indoor positioning infrastructure are discussed in detail in conjunction with FIG. 5 and FIG. 6. The details of the indoor positioning module 204 associated with the system 106, as illustrated in FIG. 4 are outlined below.

FIG. 4 shows a block diagram of interactions between the indoor positioning infrastructure and indoor positioning module of the system of FIG. 2 in an indoor environment 400, in accordance with an example embodiment of the present disclosure.

The entry point detection module 204*a* of the indoor positioning module 204 is configured to monitor entry (and exit) of mobile devices and/or user devices into or out of the indoor environment 400. In some aspects, the entry point detection module 204a comprises one or more cameras, one or more contactless detectors such detectors based on Radio Frequency Identification (RFID) technology, or any other sensor-based detection devices. Once a user enters the indoor environment 400, by crossing the entry point detection module 204a, they are given a unique identifier (ID) at the entry point detection module 204a, which is subsequently used for tracking the user throughout the indoor environment 400. The tracking may include for example, real-time location data tracking of the user device. The real-time location data may be determined based on the unique identifier of the user device. In some aspects, this unique identifier is a media access control (MAC) address associated with user's mobile device, such as the user device 102a. This unique identifier is later used for tracking and navigation assistance functions provided by the indoor positioning module 204.

The indoor positioning module 204 further comprises the triangulation module 204b for carrying out operations related to triangulation calculations based on signals received from Wi-Fi access points (WAPs) and identification of location of the user device 102a based on the principles of triangulation. Triangulation is a technique for detection of position of a radio transmitter, such as the user device 102a, based on known locations of two or more other units, such as WAPs, and based on knowledge of radial distance and angular displacement information of the radio transmitter. The triangulation module 204b calculates triangulation data for determining the position of the radio transmitter (the user device 102a) using known positions WAPs and identified angular and radial properties of the radio transmitter based on ToF calculations, carried out by the ToF calculation module 204c.

The ToF calculation module 204c is configured identify time of flight data, which is the difference between a first-time instance when a signal was transmitted from a leaky feeder slot and a second time instance when the signal was received back the leaky feeder slot. The duration of time elapsed between these two instances, also known is known as the ToF and gives an indication of the directional and/or angular displacement of the radio transmitter, which is the user device 102b. The identified position data of the user device 102b in this manner, combined with the unique identifier of the user device 102b in the form of its MAC address are then processed and then used to provide tracking and navigation features for the user device 102b in the indoor environment 400. The combination of the position data and the identifier data in this manner provides real-time location data of the user device 102b, which can be used for easily tracking the user device 102b in the indoor environment.

The 3D model generation module 204d is used to generate and output a virtual 3D model of the indoor environment 400, which comprises details down to the level of detailed floor plans, shelve locations, inventory placement positions and the like. The 3D model generation module 204d may be configured to obtain data about 3D model or 3D map and shelving and inventory placement plan of the indoor environment 400, based on a pre-configured or pre-downloaded map of the indoor environment 400. This may be accomplished using API calls configured for accessing a database of the service provider associated with the indoor environment 400. For example, the system 106 may be allowed using a contractual agreement between the system 106 (or a company that makes or develops the app associated with the system 106) and the service provider (which may be the owner of the indoor environment 400), to access the service provider's database 102b1, through one or more API calls. The API calls may then enable accessing a pre-configured and dynamically updated map of the indoor environment 400 for generating a virtual 3D model of the indoor environment 400 (such as on a display associated with the user device 102a) which may be used to provide navigation related functions, such as routing instructions for turn-by-turn navigation, to the user within the indoor environment 400. The pre-configured and dynamically updated map of the indoor environment 400 is then displayed as the virtual 3-D model on the user interface of the user device 102a. The displayed 3-D model is then further used to show user's location obtained previously, for providing routing instructions.

The routing module 204e may be configured to process information provided by modules such as the entry point detection module 204a, the triangulation module 204b, the ToF calculation module 204c, and the 3D model generation module to generate routing information and instructions for the user. The routing information and instructions may include turn-by-turn navigation instructions for the user to navigate in the indoor environment. The routing module 204e is also configured to obtain information about user's other needs and preference, such as whether the user wants to navigate to a particular spot within the indoor environment 400 (such as a luggage collection point if the indoor environment 400 is for an airport), whether the user is looking for a specific item to shop (such as looking for eggs to shop when the indoor environment 400 is for a retail store), whether the user is looking to exit the indoor environment 400, and the like. These specific information may be obtained from the user, either through inputs received from the I/O module 202, or automatically, based on identification of user's location and context information.

The routing module 204e may also be configured to obtain information the cluster avoidance module 204f in some aspects. The cluster avoidance module 204f may be configured to provide output data associated with provision of enhanced user experience by considering user safety measures including social distancing awareness, avoidance of crowded or clustered spaces, providing of alternate recommendations based on current situation and/or context of the user, and the like. For example, a user who may have finished shopping in a retail store, may be proceeding towards a billing/check-out counter. A first billing counter with more people in queue may be nearer to the current position of the user, as against a second billing counter which may be very far from the current position of the user but is very less crowded or is nearly empty. Thus, the cluster avoidance module 204f provides an output to the user indicating that they should move towards the second billing counter to maintain social distancing measures.

The indoor positioning module 204 and all its sub-modules as discussed above may thus be able to provide safe, efficient, and reliable indoor navigation to the users by using advanced positioning infrastructure and positioning techniques. The advanced positioning infrastructure 110 is also outlined as illustrated in FIG. 4, and comprises, the leaky feeder cable network 110a, plurality of Wi-Fi access points 110b, and the entry point detection unit 110c. This is further explained in conjunction with FIG. 5 and FIG. 6.

Figure 5:
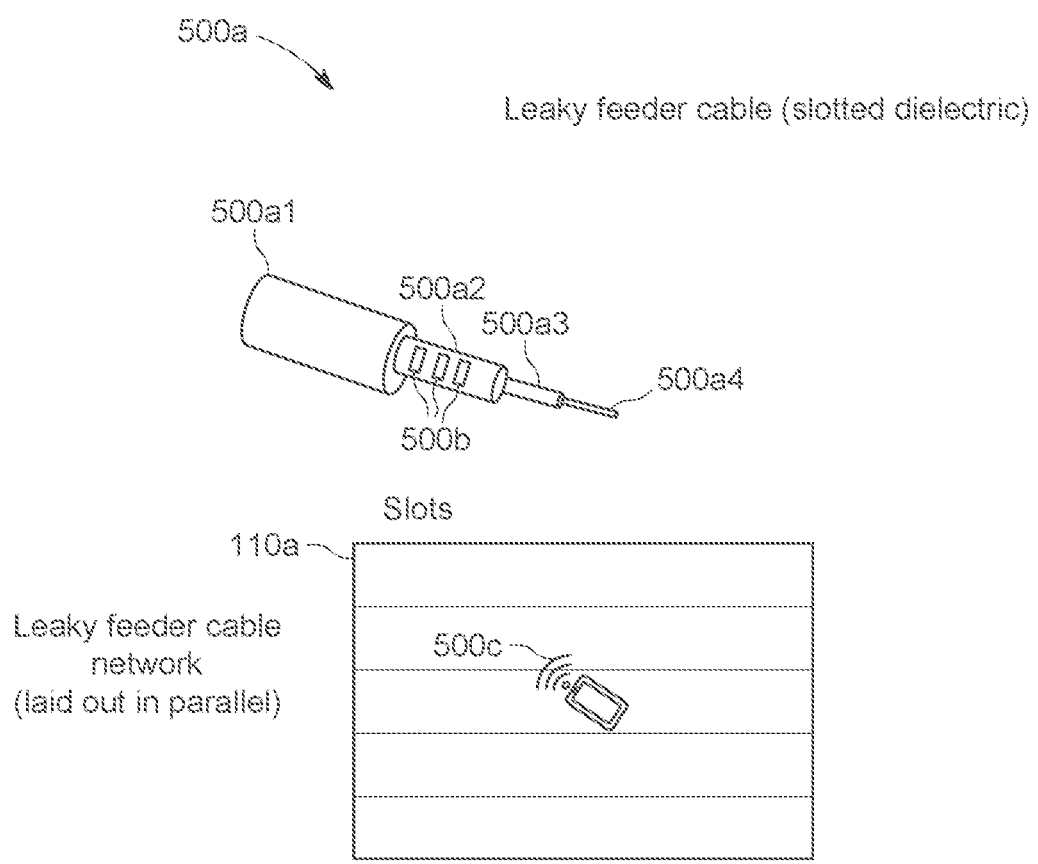
FIG. 5 shows exemplary implementation of the indoor positioning infrastructure, in accordance with an example embodiment of the present disclosure.

FIG. 5 shows exemplary implementation of the indoor positioning infrastructure 110, in accordance with an example embodiment of the present disclosure. The indoor positioning infrastructure 110 comprises a transmission infrastructure having a network of leaky feeder cables 110a laid out in parallel in an area associated with an indoor environment, such as the indoor environment 400. Each leaky feeder cable 500a in the network of leaky feeder cables 110a comprises a slotted dielectric cable, which has a plurality of slots 500b throughout its length for leaking or emitting of radio signals from each slot in the plurality of slots 500b.

The leaky feeder cable 500a comprises a co-axial cable 500a formed by an outer jacket 500a1, a shield 500a2, a dielectric 500a3, and an inner conductor 500a4. The inner conductor 500a4 is made of an electrically conducting material such as copper, and carries an electrical signal, such as a radio frequency (RF) signal. The inner conductor 500a4 is separated from the shield 500a2 by the dielectric 500a3 placed in between. The shield 500a2 contains an aperture in the form of the plurality of slots 500b, which act as antennas for emitting the RF signals in the indoor environment 400, which can be received by the inner conductor 500a4. The plurality of slots 500b function as antennas because the gap in shield 500a2 allows the RF signals to flow into co-axial cable 500a.

The network 110a of such leaky co-axial cables comprises several leaky feeder cables laid out in parallel at the appropriate area. For example, these leaky feeder cables may be laid out along the roof or ceiling of the indoor environment 400. When a mobile device 500c, such as the user device 102a, navigates through such an indoor environment 400, its position may be detected by performing triangulation and ToF calculations, as illustrated in FIG. 6.

Figure 6:
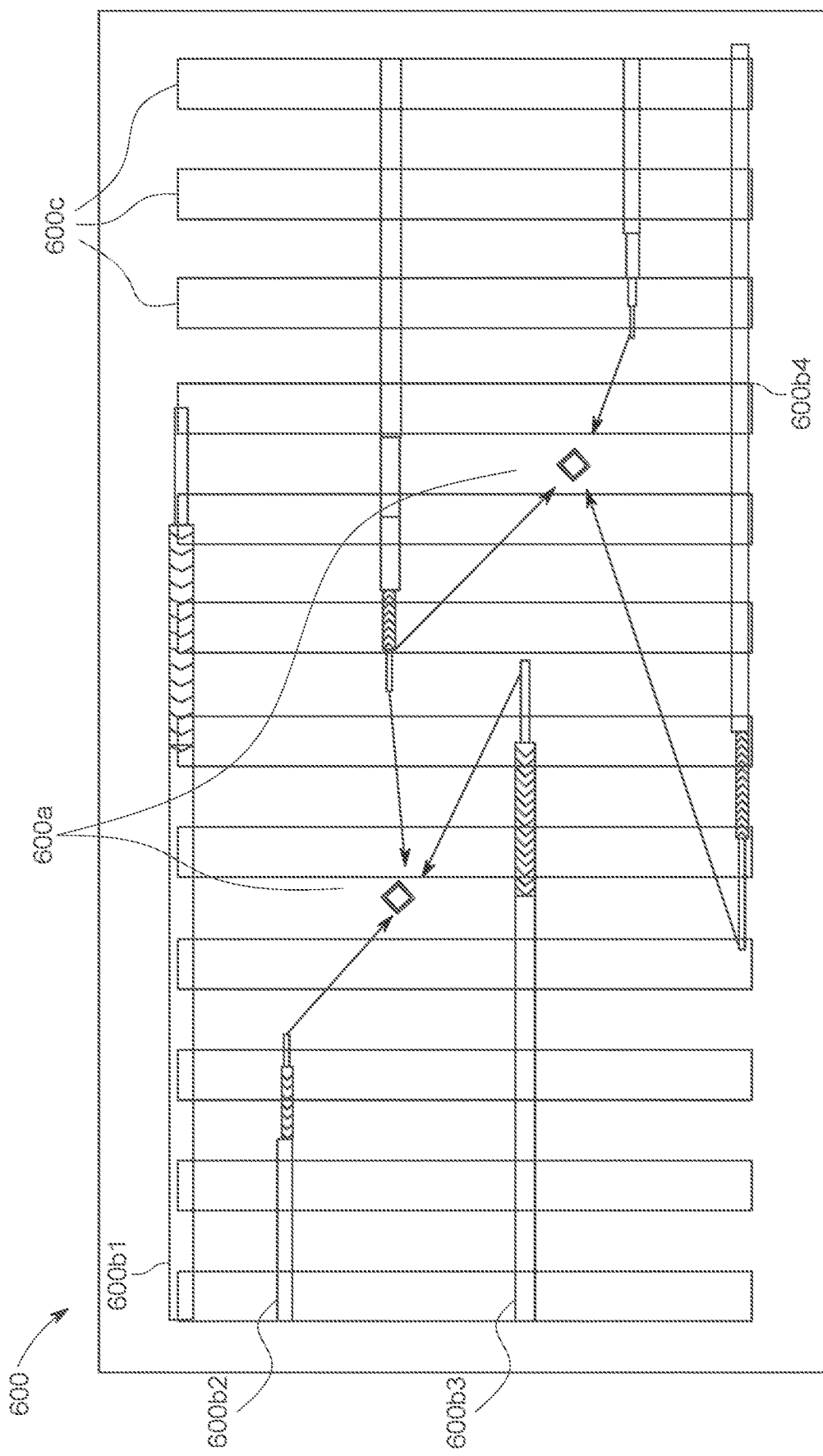
FIG. 6 shows another exemplary implementation of the indoor positioning infrastructure, in accordance with an example embodiment of the present disclosure.

FIG. 6 shows another exemplary implementation of the indoor positioning infrastructure 110a, in accordance with an example embodiment of the present disclosure. FIG. 6 illustrates an indoor environment 600 in which one or more mobile devices 600a are present. The indoor environment 600 comprises a network of parallelly laid out leaky feeder cables 600b1, 600b2, 600b3 and 600b4 (like the network 110a shown in FIG. 5). Further, the indoor environment 600 comprises a plurality of aisles 600c or rows where a plurality of Wi-Fi access points, such as supported or configured by the Wi-Fi access point module 110b shown in FIG. 4, may be located. In some aspects, the plurality of aisles 600c correspond to a plurality of shelves or racks placed on a floor in a retail store.

The position of each of the multiple mobile devices 600a in the indoor environment 600 may be detected by the indoor positioning module 204 using the entry point detection module 110c (analogous to the entry point detection module 204a) of the indoor positioning infrastructure 110 illustrated in FIG. 4, the triangulation module 204b, and the ToF calculation module 204c. To that end, the indoor positioning infrastructure forms a position detection infrastructure made up of the entry point detection module 110c, which is configured to uniquely each of the multiple mobile devices 600a at an entry point of the indoor environment 600 via the mobile devices' unique MAC address. Further, the leaky feeder cables 600b1, 600b2, 600b3 and 600b4 comprise Wi-Fi access points which also form part of the forms a position detection infrastructure placed strategically in the leaky feeder cables, by strategically designing the positions of the slots in the leaky feeder cables 600b1, 600b2, 600b3 and 600b4. When any of the multiple mobile devices 600a is to be located, the ToF of a Wi-Fi access point signal is calculated by the ToF calculation module 204c using a first RF signal sent from the Wi-Fi access point to the mobile device 600a, and a second RF signal received at the Wi-Fi access point from the mobile device 600a. The mobile device is identifiable by its MAC address, as already stated. Further, the locations of each of Wi-Fi access points is already known, so the position of the mobile device 600a may be calculated by triangulating the position (such by the triangulation module 204b) of the mobile device 600a, as observed by multiple Wi-Fi access points. Thus, using the ToF and triangulation calculations, and based on the mobile device's MAC address, each mobile devices' exact position may identify by the indoor positioning module 204.

Generally, Wi-Fi technology has a short detection range, but a Wi-Fi signal can extend up to 150 meters. Thus, accuracy of detection of location of each mobile device 600a generally depends on how many Wi-Fi access points are installed and the environment, such as the indoor environment 600, in which they are deployed. The more access points are present in each area, the more accurate the detected location of the mobile device 600a is. Wi-Fi can provide about 2 m accuracy using existing crowd sourced Wi-Fi infrastructure with no calibration. However, through calibration, surveying and fine tuning, Wi-Fi can even achieve sub-meter meter accuracy in the indoor environment 600.

In some aspects, the indoor environment 600 comprises multiple levels or floors.

Thus, the position of the mobile device 600a is also detected vertically, by performing the same detection and positioning at each floor level.

In some aspects, the leaky feeder cable network 110a comprises a plurality of cables corresponding to the number of levels in the indoor environment 600, to run in a vertical direction so that the leaky coaxial cables 600a1, 600a2, 600a3, and 600a4 are arranged horizontally in the spaces each level, and further multiple cables extend in multiple vertical levels for each floor.

In this manner, the indoor positioning module 204 may be able to provide accurate, efficient, attenuation or signal loss resistant and adaptive indoor positioning technologies, that may assist in providing enhanced indoor navigation and enhanced user experience to the users of the system 106.

The system 106 further comprises the imaging and computer vision module 206, which is configured to capture images of one or more items using imaging sensors and computer vision techniques. The imaging and computer vision module 206 further comprises various sub-modules as illustrated in FIG. 10.

Figure 10:
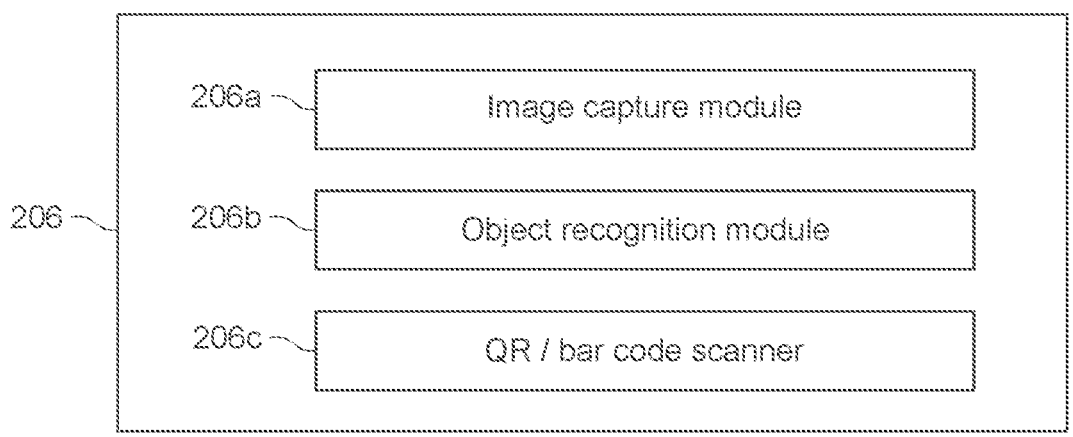
FIG. 10 shows an exemplary implementation of the imaging and computer vision module of the system of FIGS. 2A-B, in accordance with an example embodiment of the present disclosure.

FIG. 10 illustrates the details of the imaging and computer vision module, according to an embodiment of the present disclosure. The imaging and computer vision module 206 comprises an image capture module 206a, an object recognition module 206b, and a QR/bar code scanner module 206c.

The image capture module 206a is configured to enable capturing of images of different items using one or cameras associated with the system 106. These items may include such as grocery items placed in a user's home or in a retail store, images of shopped items of a user, user's own images, images of logos, images of people, images of places, images of banners, images of cosmetics, images of stationary items, and the like. For example, a household consumer may take images (such using a camera of their user device 102a) of different types of fruits placed at home, or from a magazine or any other source, and use them to build their shopping list. Similarly, a user in a service provider environment, such as a salesman or a clerk at checkout counter, may capture images of different items shopped by a user in their store, and use them to generate item list for billing or reconciliation purposes. The service provider user uses their user device 102b for generating this list. The user device 102b may be such as a kiosk or a point-of-sale (POS) terminal used in the store.

Apart from image capturing devices which user manually triggers, there may be image capturing devices triggered automatically by sensors, such IoT based devices, which enable automatic image capturing in some aspects.

The image capture module 206a may communicate with the object recognition module 206b for recognition of the one or images captured by the image capture module 206a. The object recognition module 206b may be configured to use advanced image recognition technologies such as computer vision, artificial intelligence-based image recognition, optical character recognition, face detection, pattern matching, and the like. The identified images are then used to identify the object whose image was captured.

In some aspects, the images provided to the object recognition module 206b are provided by the QR code scanner or the bar code scanner 206c. The QR/bar code scanner 206c is configured to detect a QR code or a bar code respectively and identify the encoded text/link/content of the corresponding QR code or bar code.

In some aspects, the QR/bar code scanner 206c is associated with a QR/bar code database which is used for object recognition by the object recognition module 206b.

In some aspects, the object recognition module 206b uses an image database for object recognition. The image database may be a pre-built databased of images and may also be continuously updated and enhanced in real-time based on newly captured and recognized images and objects which were not earlier in the image database.

In some aspects, the imaging and computer vision module 206 may be configured to obtain images and computer vision data from unmanned aerial vehicles (UAVs) or drones (referred to hereinafter as drones for the sake of ease, but without any limitations to the scope of the present disclosure) installed within the indoor environment. The drones may be equipped onboard with one or more sensors, such as cameras, radar, lidar, and the like. Using the various sensors onboard a drone, indoor images related to for example, indoor mapping, indoor floor plan, shelving patterns, inventory placement and status, object placement, user placement and the like may be captured, and sent to the imaging and computer vision module 206 for further processing. In general, drones represent a class of electrical vehicles that are remotely operated autonomously. These electric vehicles, specifically, the aerial vehicles or drones, may be used for commercial services, such as package delivery. For example, the drone may have to deliver a cargo. Use of the drones for delivery may provide economic benefits, convenience, and delivery of time-critical good and services to difficult-to-reach places. However, in this disclosure, the drones may be used to provide the same benefits, but within the indoor environment associated with the system 106. It may be noted that throughout the present disclosure, the term "drone" is used interchangeably with "aerial vehicle", "electric aerial vehicle" and "unmanned aerial vehicle". This should not be construed as a limitation of the present disclosure.

In some aspects, the drones may also be configured to provide payment and check-out support, such as at the exit points of the indoor environment were the system 106 is operational. For example, dedicated check-out drones may be installed near a store's exit points. These check-out drones may assist shoppers in managing check-out and payment processes. Such a drone may, for example, take a picture of the items shopped by a user for reconciliation and billing, further based on verification of purchased items, payment processing using user's mobile wallet, card or any other available financial instrument may be initiated by the drone. Once the payment is successful, the user may receive a payment receipt and successfully exit eh store.

The drone may be communicatively connected to the imaging and computer vision module 206 over a communication channel such as the network 104. In some aspects, the system 106 may reside on the drone as a processing component. In either case, the drone may be configured to provide imaging and computer vision functions, indoor mapping and floor plan generation assistance functions, payment and checkout functions, and inventory management functions as described above, without deviating from the scope of the present disclosure.

To that end, the imaging and computer vision module 206 may be equipped with a computer vision based machine learning model (CVML) configured to analyze the images received or captured by one or more sensors, such as drone cameras. The CVML may be trained on a training database of plurality of images of various items within the indoor environment and also additional image data derived from other generic databases, such as using internet. To that end, the training of the CVML may be performed offline, and each time a new image is received by the imaging and computer vision module 206, the training database may be updated using the new image data. In this way, the CVML may be configured to provide a robust classification and identification of images. Some of these techniques may include such as deep learning, neural nets, decision trees, Bayesian nets, and the like.

Using any combination of techniques described above, the imaging and computer vision module 206 may be configured to capture, identify, analyze, and process the various images by the system 106.

The system 106 further comprises the shopping list module 208 configured to assist a user in managing their shopping experience using the system 106 (or the app installed on their user device 102a). The shopping list module 208 assists a user in various functions such as shopping list generation, shopping list prioritization, shopping list budgeting, shopping list reconciliation, and the like. For this purpose, the shopping list module 208 comprises a generation and prioritization module, which further comprises various sub-modules as illustrated in FIG. 7.

Figure 7:
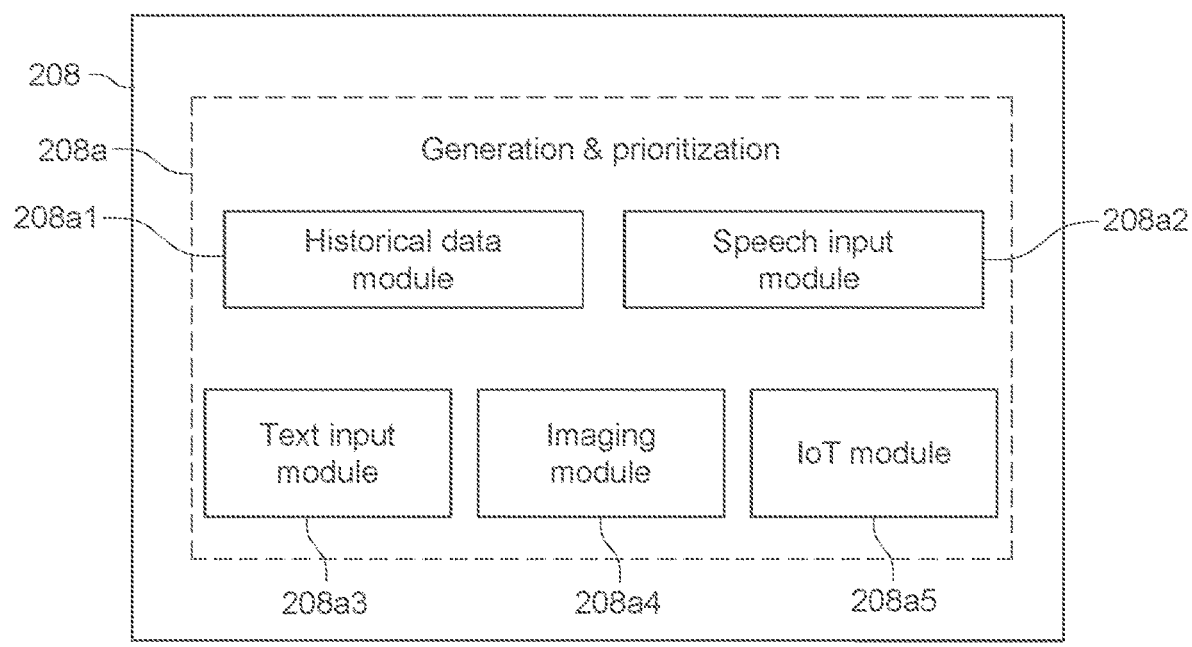
FIG. 7 shows an exemplary implementation of shopping list module of the system of FIG. 2, in accordance with an example embodiment of the present disclosure.

FIG. 7 illustrates the details of the shopping list module 208. The shopping list module 208 comprises the generation and prioritization module 208a, which further comprises various sub-modules. The various sub-modules comprise a historical data module 208a1, a speech input module 208a2, a text input module 208a3, an imaging module 208a4, and an IoT module 208a5.

The shopping list module 208 is configured to obtain user input associated with generation of an item list for the user. The item list may comprise a shopping list which comprises a list of items that the user wants to shop for or purchase. The user input can be in one of the forms such as text, speech, sensor based detection etc. To that end the shopping list module comprises various sub-modules described below, which may be used for the item list (or shopping list) generation.

The historical data module 208a1 is configured to assimilate, analyze, process, and transform historical user data. The historical user data may be related to a user's shopping preferences, preferred brands, payment methods, card/bank details, loyalty account information, any accrued/pending rewards or benefits, user profile information including user's personal details like username, user address, user contact number and the like. The historical data may be stored in the service provider's database 102b1, and some data may be stored in some third-party servers 112 that are associated with user. The system 106 may be configured to obtain this data from the service provider's database 102b1 and the third-party servers 112, and further make it accessible for use by the historical data module 208a1 of the shopping list module 208.

The shopping list module 208 further comprises the speech input module 208a2. The speech input module 208a2 is configured to take input from the audio/voice/sound module 202c of the I/O module 202, which receives user input in the form of speech or user's voice commands. The user's voice commands may be related to generation of a shopping list. The speech input module 208a2 parses user's voice and analyzes the voice for various operations to interpret the voice command for its intended action. These operations may include such as template matching, feature extraction, phonetic analysis, intent analysis, natural language understanding (NLU) and the like. The operations may enable the system 106 to understand the user' voice-based instructions and generate a shopping list for the user. For example, a user may open the app on their user device 102a and select a voice input mode and then speak "Jess, help me to create a shopping list". Then, the app through its I/O module 202 may invoke the UI/UX display module 202f to display an interface for generation of shopping list, and the user continues to speak "Jess, add apples, bananas, bread, milk and coffee to my shopping list". Consequently, the interface displays a shopping list to the user with all items added as per user's voice commands. Later, the user may add or delete or edit any items from the shopping list based on their preference. Similarly, the user could any other modes like text or images or sensor-based input for shopping list generation, as outlined below.

The text input module 208a3 is configured to process text-based user input for generation and prioritization of the shopping list of the user. For example, the user may use a keyboard, a keypad, a touch panel, a pen, a stylus, and the like to provide text input for generation of the shopping list. The text input module 208a3 then parses the user input text and uses it for shopping list generation and prioritization.

The imaging module 208a4 is configured to receive images of items captured using the imaging and computer vision module 206, and then may be used to process the images for generating the shopping list.

The IoT module 208a5 is configured to receive input from the IoT module 202d and generate the shopping list for the user-based inputs received from one or more sensors in the user's environment, such as smart sensors, smart cameras, smart appliances, and the like.

Further, once the shopping list is generated in any of the manners described above, the system 106 performs one or more optimizations on the shopping list, through the functionality implemented by the optimization module 218.

The optimization module 218 is configured to perform one or more optimization operations associated with user's overall user experiences offered through the system 106. These optimization operations may include shopping list optimization, indoor route optimization, outdoor route optimization, budget optimization, optimized indoor mapping of user's location and available functions in the indoor environment 400 and the like. The optimization operations may be performed to re-arrange the items in the user's item list in order of at least a priority criterion or an optimization criterion. The priority criterion comprises arranging the items based on their priority while shopping. For example, milk may be given higher priority as compared to chocolates. The optimization criterion may include at least one of a distance criterion, a budget criterion, a social distance criterion, and the like. In some aspects, the user's historical data may be used to identify and/or form the priority criterion and the optimization criterion. To that end, the optimization module 218 comprises various sub-modules for performing the various optimization operations, as illustrated in FIG. 8.

Figure 8:
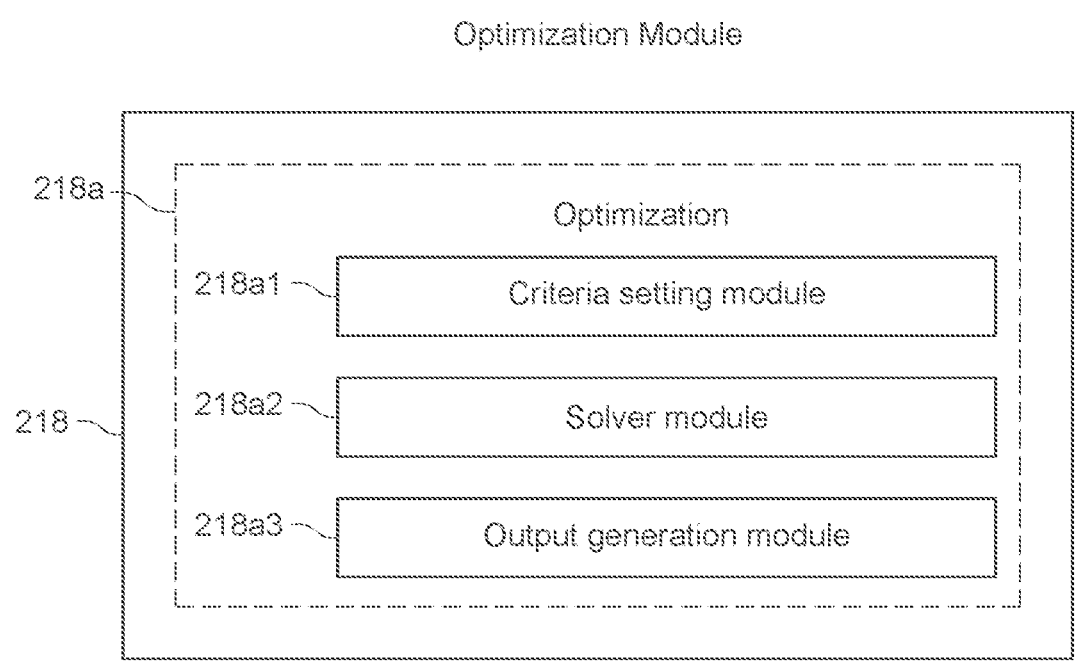
FIG. 8 shows an exemplary implementation of optimization module of the system of FIGS. 2A-B, in accordance with an example embodiment of the present disclosure.

FIG. 8 shows an exemplary implementation of the optimization module 218 of the system of FIG. 2, in accordance with an example embodiment of the present disclosure. The optimization module 218 comprises an optimization sub-module 218a which further comprises various sub-modules including but not limited to a criteria setting module 218a1, a solver module 218a, and an output generation module 218a3.

The criteria setting module 218a1 is configured to determine one or more criteria associated with performing of a corresponding optimization operation. The one or more criteria may include but are not limited to a priority criterion, an optimization criterion further comprising at least: a distance setting criteria, a budget setting criteria, several stores to visit criteria, a route setting criteria, a social distancing criteria, a shopping criteria, a traffic criteria, a weather criteria, a time setting criteria, and the like. The one or more criteria may be set by the user by providing user input indicative of the corresponding criteria. In some aspects, however, the one or more criteria may be automatically determined by the system 106. The automatic determination of the one or more criteria may be done by the system 106 based on a plurality of parameters, including, but not limited to: user's purchase history, user's context information, user' location, user loyalty account information, user's payment data information and the like. In some aspects, the system 106 uses AI and machine learning technologies for performing automatic criteria determination. Once the one or more criteria are set in this manner, the solver module 218a2 uses the determined one or more criteria for performing one or more corresponding optimization operations.

The one or more corresponding operations may include but are not limited to setting a distance limit for suggesting a navigation for the user route, identifying the items available to shop based on the budget criteria of the user, identifying a list of stores that the user can visit based on the user's shopping list and the number of stores criteria set by the user, recommending the user to expand their shopping list based on budget available and price of other items in the shopping list of the user, determining prohibited areas for visit of the user based on the social distancing criteria, and the like. The solver module may be configured to use AI and machine learning technologies for performing the one or more corresponding optimization operations described above. Once the optimizations have been performed based on the one or more criteria, the results of the optimizations may be provided to the user via the output generation module 218a3.

The output generation module 218a3 may be configured to generate one or more outputs for the corresponding optimization operation. The one or more outputs may include such as displaying an optimized shopping route to the user on the virtual 3D model if the indoor environment 400, displaying an optimized shopping list on the UI/UX display module 202f, displaying a list of stores for the user to visit, displaying options to edit or delete or modify items in the shopping list of the user based on the one or more optimization criteria, and the like. In some aspects, the output generation module 218a3 may be configured to generate a voice-based output, such as voice-based turn-by-turn indoor navigation instructions, based on the corresponding route optimization operation.

In some aspects, the output generation module 218a3 is configured to interface with the persona/avatar generation module 202a for providing an interactive avatar for communicating with the user, on behalf of the system 106.

In various aspects, for generating the output of the shopping list generation and optimization functions, the system 106 makes use of the capabilities provided by the analytics module 216 and the AI/ML module 214.

The analytics module 216 is configured to analyze the various inputs received by the system 106, analyze them, and perform further processing on them based on the identified input. The analytics module is further explained in conjunction with FIG. 9.

Figure 9:
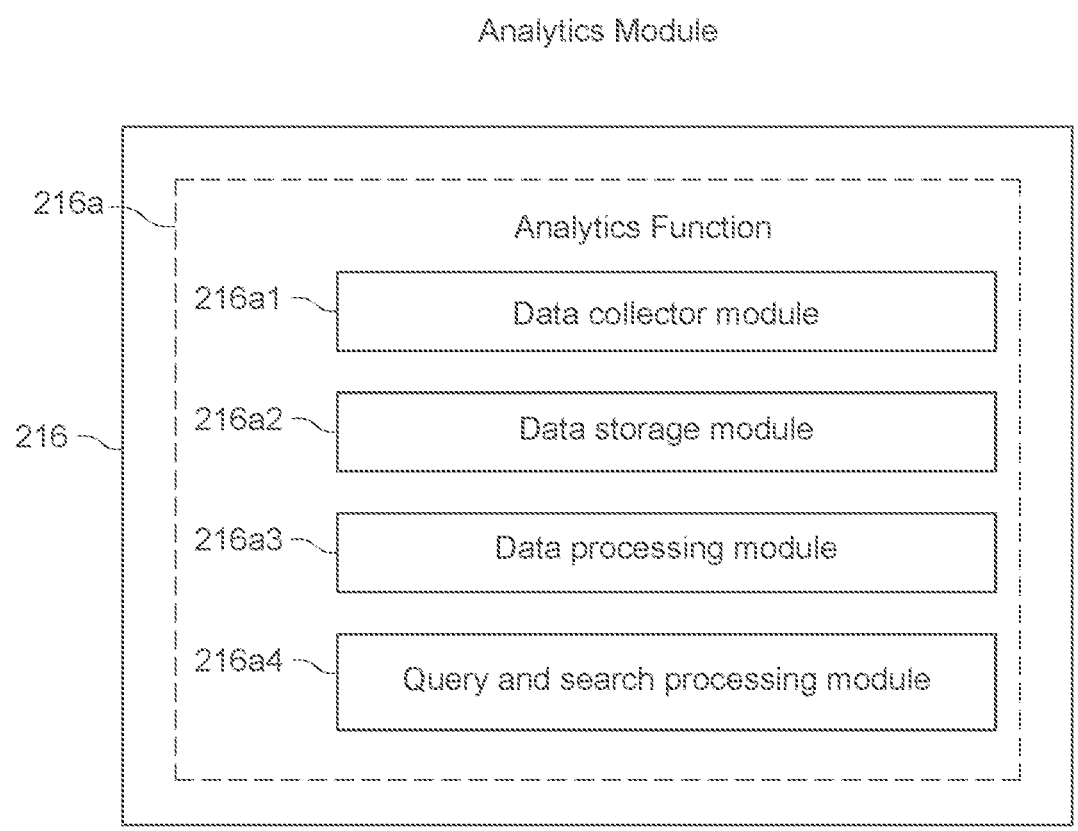
FIG. 9 shows an exemplary implementation of analytics module of the system of FIG. 2, in accordance with an example embodiment of the present disclosure.

FIG. 9 illustrates the various sub-modules associated with the analytics module 216. The various sub-modules include an analytics functions module 216a which further comprises a data collector module 216a1, a data storage module 216a2, a data processing module 216a3, and a query and search processing module 216a4.

The data collection module 216a1 is configured to collect or receive data from other modules and use it for further analytics processing. The data may be related to such as user's input to the system 106, user history data, user loyalty related information, user's shopping list analysis, navigation related data, user's optimization criteria data, floor management data, inventory data, item's image data, and the like. The data collector module 216a1 acts as interface between the analytics functions module 216a1 and the rest of the system 106.

The analytics functions module 216a1 further comprises the data storage module 216a2, that is configured to store the data received by the data collector module 216a1, such as for intermediate processing, and further provide it to the data processing module 216a3. The data storage module 216a2 may comprise a memory, such as in the form of non-transitory computer-readable storage medium. The data storage module 216a2 may also be configured to store computer-executable instructions or programs or algorithms, which enable the analytics functions module 216a to carry out its desired functions.

The desired functions of the analytics function's module 216a are carried out by the data processing module 216a3 that is configured to carry out the various functions. These functions may include but are not limited to user input analysis, user history analysis, route analysis, navigation constraints analysis, user criteria analysis for optimization and prioritization, shopping list analysis, item images analysis, user shopping analysis for reconciliation, floor data analysis, inventory data analysis, and the like. The data processing module 216a3 may be implemented in the form of a processor which contains required logic circuits configured to carry out one or more of computer-executable instructions and programs to perform the various analytics functions. The data processing module 216a3 may also be configured to interface with the query and search processing module 216a4 to access any additional data needed for carrying out its functions.

The query and search processing module 216a4 may be configured to execute queries to one or more databases, such as the service provider database 102b1, the system database 108b, and/or a database associated with the third-party servers 112, to access any information required for analytics processing. For example, this information could be related to an image captured by the user device 102a. To analyze the image and convert it to an item in the user' shopping list, the data and query processing module 216a4 may query the image database stored in the database 108, and then the data processing module 216a3 may classify and identify image based on the data retrieved by the query and search processing module 216a4.

In some aspects, the analytics module 216 may be configured to perform the various functionalities of the analytics function's module 216a based on AI and ML technologies. For this, the analytics module 216 interfaces with the AI/ML module 214. The AI/ML module 214 is explained in conjunction with FIG. 13.

Figure 13:
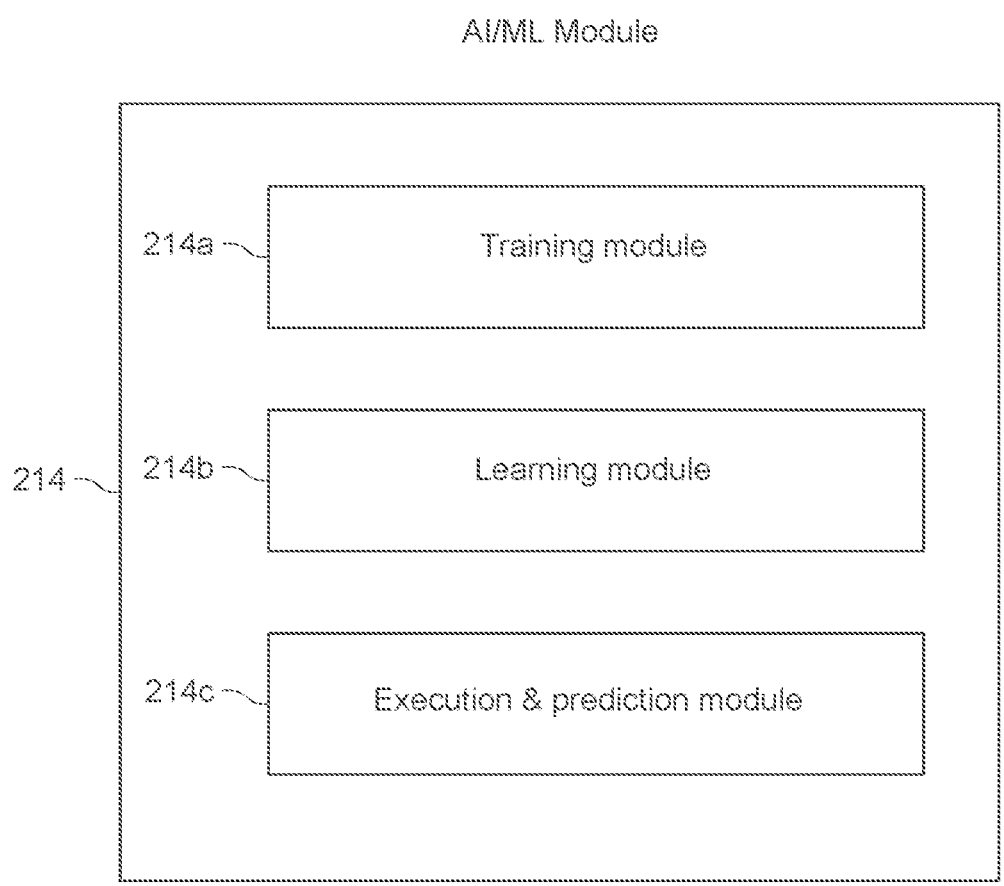
FIG. 13 shows an exemplary implementation of the AI/ML module of the system of FIGS. 2A-B, in accordance with an example embodiment of the present disclosure.

FIG. 13 shows an exemplary implementation of the AI/ML module 214 in accordance with an example embodiment of the present disclosure. The AI/ML module 214 may be configured to implement an AI/ML algorithm, such as regression algorithms, decision tree algorithms, deep neural networks, support vector machines, random forest algorithm, reinforcement learning algorithm and the like. The AI/ML module 214 comprises several sub-modules including a training module 214a, a learning module 214b, and an execution and prediction module 214c. The various sub-modules of the AI/ML module 214 are configured to interact and exchange data with each other, in order to carry out learning goals and objectives of the system 106.

The training module 214a is configured to provide training dataset and training instructions for real-time training of a machine learning model stored in the learning module 214b, in order to provide a trained machine learning model, which is again stored in the learning module 214b. The trained machine learning model is then used by the execution and prediction module 214c, which takes inputs of real-time or current user data, such as from any of the: the analytics module 216, the shopping list module 208, the optimization module 218, the indoor positioning module 204 and the like; and applies these inputs on the trained machine model stored in the learning module 214b to generate a learning outcome operation. The learning outcome operation may be one of an execution outcome or a prediction outcome. The execution outcome includes an action to be performed in real-time, based on the trained machine learning model. The prediction outcome includes a prediction or a forecast output, which may be provided as a recommendation output to the user or may be used for further processing.

For example, for indoor navigation service provided by the system 106, the training module 214a may take as input user trajectory data as the training dataset. Based on this, the learning module 214b may update or train in real-time the stored machine learning model, and the trained machine learning may then take inputs from the indoor positioning module 204, about the user's real-time location (tracked using the indoor positioning infrastructure 110 and the indoor positioning module 204). Further, when these inputs are applied to the training machine learning model, the execution and prediction module 214c may provide user's predicted trajectory and based on that may provide shopping list optimization and rearrangement.

In some aspects, the execution and prediction module 214c may be configured to provide the learning outcome related output to the I/O module 202, which may generate a suitable output in the form of at least one of: a text display, an image display, a voice/audio output, and an interactive avatar-based output.

Thus, the AI/ML module 214 may be used in conjunction with any of the sub-modules of the system 106 to provide a learning-based output recommendation to the user.

The system 106 further comprises the floor management module 210, which is configured to provide floor management services and functions by the system 106. The floor management functions comprise such as monitoring of shelving and flooring data of the indoor environment, providing routing management and navigation updates based on flooring and shelving plans and data, inventory replenishment and ordering, alerting a floor manager about a user looking for a product based on the shelving and flooring plan and user positioning data, updating floor plan data based on any real-time floor data change, and the like. The floor management module 210 further comprises a plurality of sub-modules, which are illustrated in FIG. 11.

Figure 11:
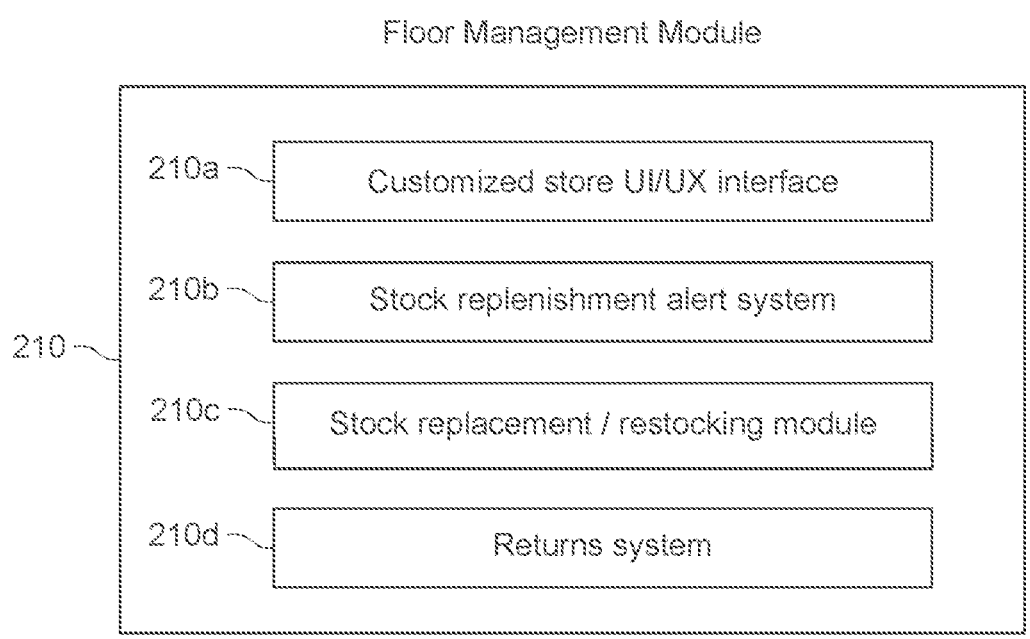
FIG. 11 shows an exemplary implementation of the floor management module of the system of FIGS. 2A-B, in accordance with an example embodiment of the present disclosure.

FIG. 11 shows an exemplary implementation of the floor management module 210 of the system 106, showing the various sub-modules. As illustrated, the floor management module 210 comprises a customized store UI/UX interface module 210a, a stock replenishment alert system module 210b, a stock replacement/restocking module 210c, and a returns system module 210d.

The customized store UI/UX interface module 210 is configured to provide a UI/UX display which is customized as per the user, in case the user is the service provider, having the user device 102b. In some aspects, if the user is a retail store, the UI includes options such as shopping list verification, shopping items identification, billing, reconciliation, return, payment/checkout, rewards/coupon code, and the like.

In other aspects, when the user is an airport facility, the UI includes options such as arrival checking, luggage status, luggage weight, custom requirement, declarations, ticketing, checkout, immigration status, visa check, and the like.

The floor management module 210 also includes the stock replenishment alert system 210b, which is configured to generate an alert to indicate that a stock needs to be replenished. The alert may also indicate the exact location, in terms of the floor, corresponding aisle, and the shelf that needs to be refilled with stock. In some aspects, the different racks or shelves are fitted with sensors, such as cameras, RFID scanners and the like, which continuously monitor the different items placed on shelves. This monitoring, coupled with virtual 3D model of each floor of the indoor environment, may be used to provide an indication to the service provider's staff that a particular shelf, on a particular floor is running low on stock. This indication may be provided on the service provider's user device 102b, which may be in the form of a portable device, carried by the staff, and which is able to show a virtual 3D model of the flooring and shelving plan of the indoor environment on the user device 102b, by using a customized display interface generated by the customized store UI/UX interface module 210a. Then, based on the generated display and alert, the staff can take necessary action, such as replenishing the stock, updating the inventory status, ordering more items for the stock, and the like.

Once the stock status has been alerted, and the staff has taken appropriate action, the restocking module 210c may be used to identify the updated stock, and thus, update the shelving system and virtual 3D model of the shelving system to indicate restocking. The stock status may also be updated when some stock is returned by a customer.

The returns system module 210 may be used for managing item/goods return function in the indoor environment 400, such as in a retail store, airport, hospital or pharmacy store, bookshop or library, and the like. The returns system module 210 may comprise an associated UI, provided by the customized store UI/UX interface module 210a, which may be displayed on the user's device, such as on the end user device 102a or the service provider device 102b (which may be a kiosk or a POS terminal).

In an embodiment, when the end user returns an item, they hand it over to a customer service representative, who in turn uses the return system UI to update the item status as returned for the indoor environment service and updates the user account as no pending items to return. This is done by the customer service representative by selecting corresponding option from their service provider device 102b or kiosk. The item may be such as a retail product when the indoor environment 400 is a retail store, a book when the indoor environment 400 is a library, a medicine when the indoor environment 400 is a pharmacy, and the like.

In some aspects, the returned items are put back on the shelf, and the shelving plan for that floor is updated accordingly by the stock restocking module 210c.

The floor management module 210 is configured to access the map and shelving data stored in the service provider data 102b1, via APIs accessible by the system 106. For this, a legal contractual agreement is signed between the system 106 service provider and the service provider associated with the indoor environment.

The system 106 also comprises the checkout module 212 which is configured to provide a plurality of capabilities related to payment and checkout of stock or items or goods purchased or carried by a user in the indoor environment 400. The plurality of capabilities includes such as frictionless or automated self-checkout, AI based self-checkout, shopping list reconciliation and auditing, transaction settlement and payment, kiosk-free self-checkout (such as totally enabled by user's mobile device or user device 102a), cashless/card less/contact-less payment, and the like. The checkout module 212 uses advanced image capture technologies such as computer vision machine learning (CVML), high-resolution and high-speed 3D cameras, and strategic tracking of item to provide advanced tracking, check-out, and payment processing capabilities by the checkout module 212.

Figure 12:
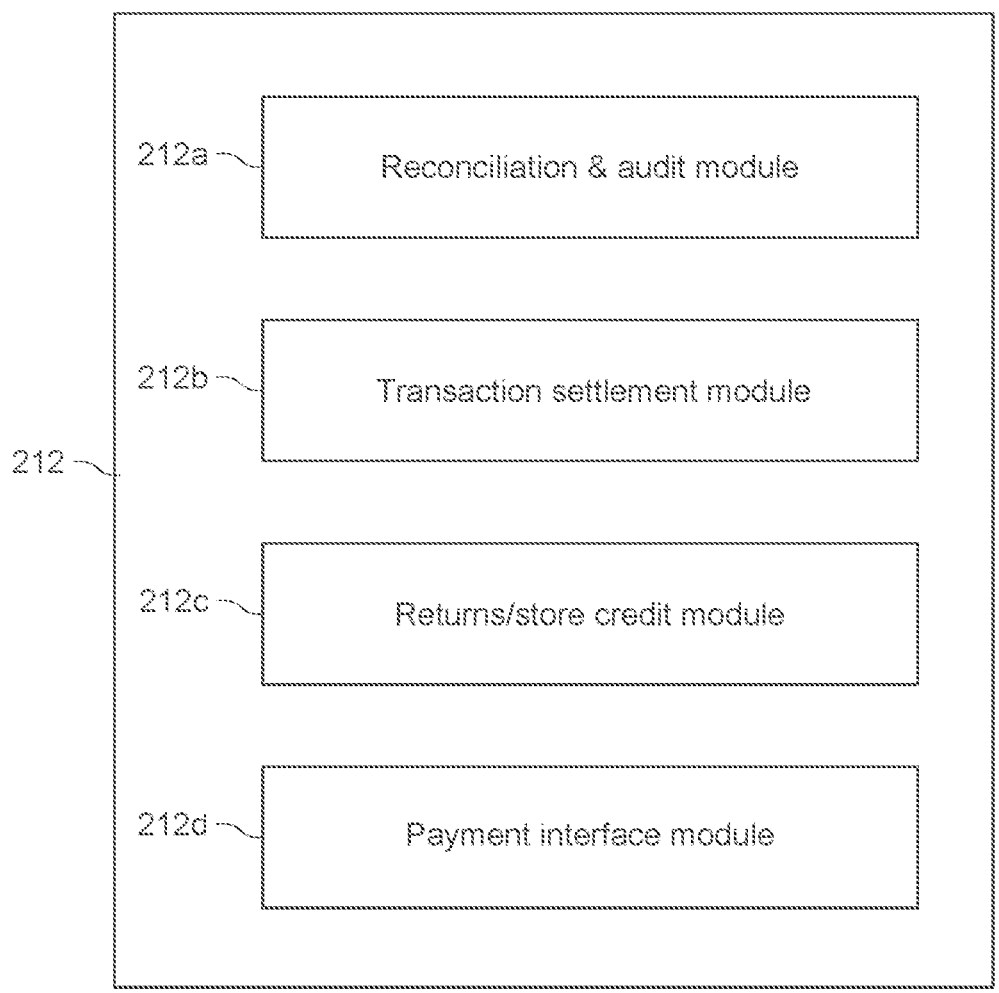
FIG. 12 shows an exemplary implementation of the checkout module of the system of FIGS. 2A-B, in accordance with an example embodiment of the present disclosure.

The checkout module 212 comprises various sub-modules to carry out the various functions, as illustrated in FIG. 12.

FIG. 12 illustrates the various sub-modules of the checkout module 212 of system 106. The various sub-modules include such as a reconciliation and audit module 212a, a transaction settlement module 212b, a returns/store credit module 212c, and a payment interface module 212d.

The reconciliation and audit module 212a is configured to provide item reconciliation and auditing. Each item shopped, accessed, or purchased by the user in the indoor environment 400 may checked, audited, and reconciled using scanners and 3D cameras. This also helps in theft prevention and detection management in the indoor environment 400.

The transaction settlement module 212b may be configured to provide a seam-less payment processing procedure to the users. In some aspects, this is done by providing at least one of a cardless, a contact-less, or cash-less payment interface to the user. For example, the user may be able to simply walk-in to the indoor environment 400, shop for items they like, and then walk-out from the store. The payment processing is done automatically by cameras, scanners, and floor management systems, which track the user through their ID, identify the items they picked up in the store, and then process their checkout by a payment account linked to the user's ID when they walk-out of the store through the exit point which detects their departure. Thus, the checkout module 212 may be configured to provide a seam-less shopping experience to the users, enabled by high-speed tracking and futuristic payment processing.

The checkout module 212 also comprises the returns or store credit module 212c, which is configured to manage return of items and their associated payment processing and store management.

The checkout module 212 further comprises the payment interface module 212d, which may be configured to provide at least one type of payment interface for a user (such as the end user or the service provider staff). The at least one type of payment interface may include: a manual billing and reconciliation interface, a cardless payment interface, a cashless payment interface, a contactless payment interface, or a combination thereof. The cardless/cashless/contactless payment interface may comprise devices such as 3D cameras, scanners, and CVML processing devices to enable automated checkout.

In some aspects, the checkout module 212 may be envisaged as a part of a server associated with the system 106. The checkout module may alternately be envisaged as part of the service provider user device 102b. This checkout module 212 may be strategically positioned, without limiting the scope, entry/exit points of the indoor environment 400. The checkout module 212 includes cameras is some aspects to take images of the items possessed/picked by the user. The items are then identified using image recognition techniques and/or the like. Further, the images may be time-stamped for keeping a log of when the user has possessed/picked the respective item.

Further, the transaction settlement sub-module 212b of the checkout module 212 that provides cashless, cardless, and contactless settlement of the accounts, may be configured to automatically deduct an amount of money from the user's payment account (such as a payment wallet and/or app associated with the user for transaction settlement.

The various modules and sub-modules of the system 200 described above may be implemented in the form of computer programs, logic instructions, algorithms, and operations, which are stored in a non-transitory computer readable storage medium, which stores computer-executable instructions specific to each type of module or sub-module described above.

Figure 2B:
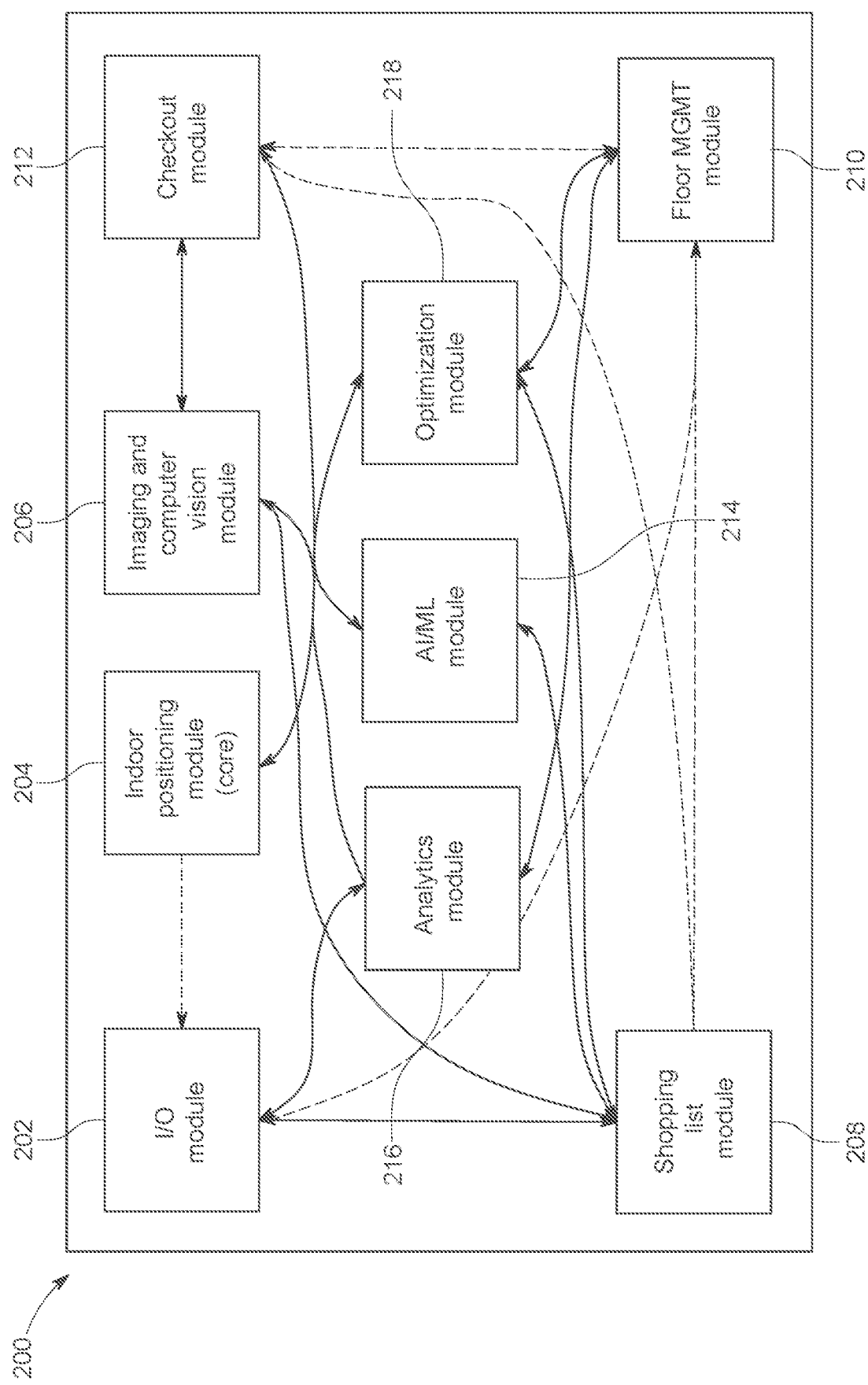
FIG. 2B shows a block diagram showing interactions between different modules of the system of FIG. 1, in accordance with an example embodiment of the present disclosure.

Further, the various modules and sub-modules of the system 200 described above may be communicatively coupled to each other to have various forms of interactions, such as one-way or two-way interactions, as illustrated in FIG. 2B.

FIG. 2B shows a block diagram showing interactions between different modules of the system 200 (or equivalently the system 106). In the FIG. 2B, dotted arrows represent one-way interactions, while solid arrows indicate two-way interactions.

For example, the I/O module 202 is configured for a one-way interaction with the indoor positioning module 204 in order to receive the positioning and location tracking data and display a virtual 3D map on a display of the user device 102a for providing indoor navigation functions. However, the I/O module 202 is configured to two-way interactions with analytics module 216, shopping list module 208, and floor management module 210 to provide shopping list display, user recommendation functions, turn-by-turn navigation suggestions in the indoor environment 400, floor wise display of the indoor environment 400 and the like.

The indoor positioning module 204 is configured for one-way interaction with the I/O module 202 and two-way interaction with the optimization module 218 to provide an optimized route for display for the user in the indoor environment.

The imaging and computer vision module 206 may be configured for two-way interactions with each of the AI/ML module 214, the analytics module 216, the checkout module 212, and the shopping list module 208 to enable provision of optimized shopping list generation, reconciliation, and automated checkout functionalities.

The shopping list module 208 is configured for one-way interactions with the floor management module 210 and the check-out module 212 to indicate stock replenishment, returns or item reconciliation status on the virtual 3D model of the indoor environment. However, the shopping list module 208 is configured for a two-way interaction with each of the analytics module 216, the AI/ML module 214, the optimization module 218, and the imaging and computer vision module 206 for providing advanced shopping list generation, prioritization, and optimization capabilities, as already described above.

The floor management module 210 is configured for one-way interactions with the shopping list module 208 and the checkout module 212 to update the floor and shelving plan and stock status. However, the floor management module 210 is configured for two-way interactions with each of the analytics module 216, the AI/ML module 214, and the optimization module 218 to use the floor management data for processing operations required by other modules. For example, the indoor positioning module 204 may access the optimization module 218 for providing an optimized indoor navigation route to the user. The optimization module in turn accesses the floor management module 210 and generates a virtual 3D map of the indoor environment and displays the optimized route on the virtual 3D map.

Thus, in the manner described above, each of the modules and sub-modules may be configured to interact with each other to carry out the various functionalities of the system 106 already described above.

Figure 14:
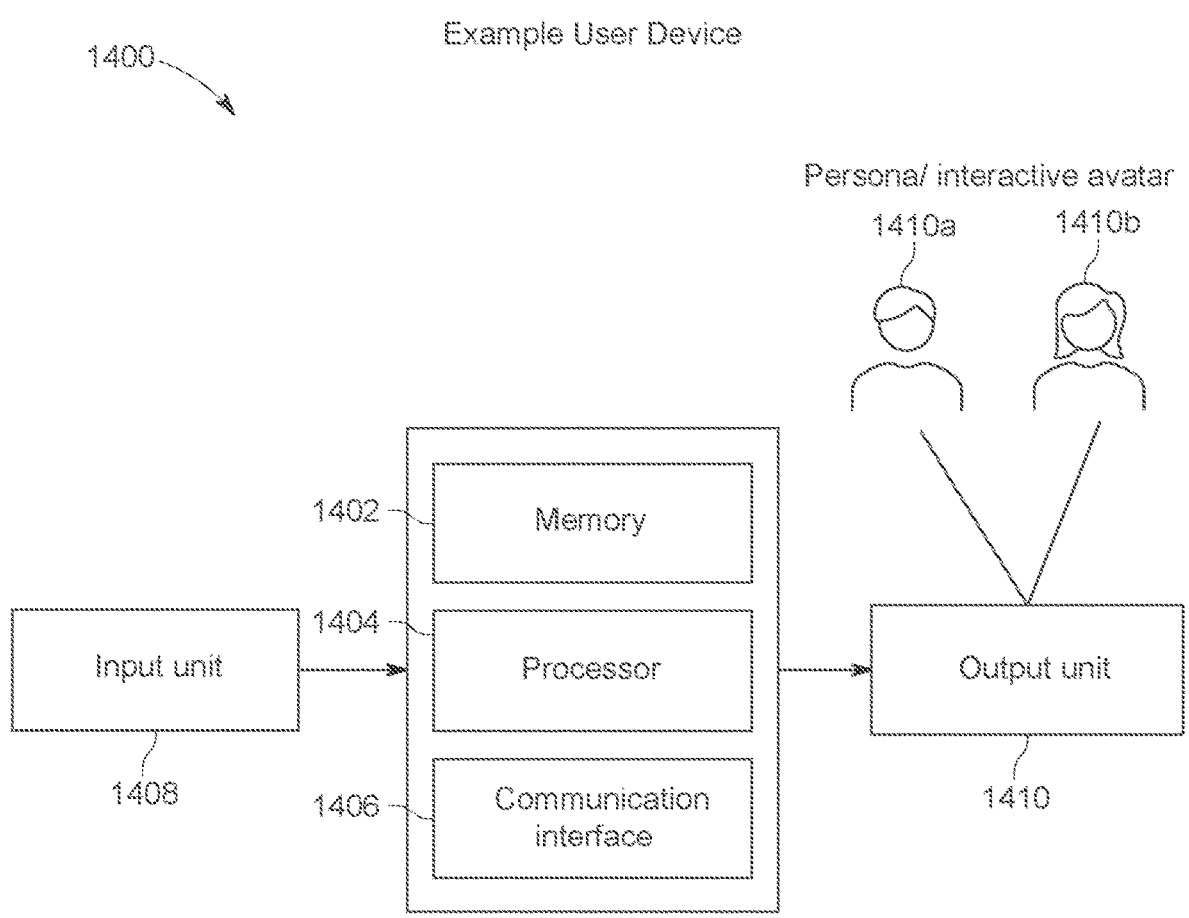
FIG. 14 shows an exemplary implementation of a user device for implementing the system of FIGS. 2A-B, in accordance with an example embodiment of the present disclosure.

FIG. 14 illustrates an exemplary implementation of a user device 1400 for implementing the system 106, in accordance with an example embodiment of the present disclosure.

The user device 1400 may correspond any of the end user device 102a or the service provider user device 102b illustrated in FIG. 1. The user device 1400 may be used in an environment which may correspond to any indoor environment such as a retail store, a hospital, an educational establishment, a conference, a trade show, a mall, a library, a university campus, a religious institution, a stadium, a sports facility, an indoor event venue, and the like.

The user device 1400 comprises an input unit 1408, a memory 1402, a processor 1404, a communication interface, and an output unit 1410. The output unit 1410 may be implemented in the form of an interactive persona or avatar, such as mail avatar 1410a or a female avatar 1410b.

The user device 1400 may correspond to any modern-day computing device including but not limited to: a mobile device like a mobile phone, a smartphone, a wearable device, a smart appliance, a laptop, a tablet, a PC, a kiosk, a POS terminal, a desktop, a computer, a phablet, and the like.

The input unit 1408 of the user device 1400 is configured to act as an interface between a user and the user device 1400 for taking an input. The input unit 1408 may comprise suitable circuitry and device components to enable any of a text-based input, a voice or speech-based input, a touch-based input, a gesture-based input, an image recognition-based input, a sensor-based input, and the like.

The memory 1402 comprises a non-transitory computer readable storage medium which comprises a combination of electronic, semi-conductor and electrical elements such as registers, gates, transistors, logic circuits and the like to store computer-executable code or programs or instructions. The memory may comprise any of RAM, ROM, EEPROM, FLASH memory, and the like.

The processor 1404 comprises a combination of circuits comprising gates, logic components, ALU, CPU, and processing capable circuits which may be configured to execute computer-executable program instructions stored in the memory. The processor 1404 may be implemented in any configuration known in the art, such as a microprocessor, a co-processor, a multi-core processor, and the like.

The communication interface 1406 comprises transmitter and receiver circuits to carry out exchange of data between the user device 1400 and other components in the system 106. The communication interface 1406 may be any means such as a device or circuitry embodied in either hardware or a combination of hardware and software that is configured to receive and/or transmit data to/from the user device 1400. In this regard, the communication interface 1406 may include, for example, an antenna (or multiple antennae) and supporting hardware and/or software for enabling communications with a wireless communication network. Additionally, or alternatively, the communication interface 1406 may include the circuitry for interacting with the antenna(s) to cause transmission of signals via the antenna(s) or to handle receipt of signals received via the antenna(s). In some environments, the communication interface 1406 may alternatively or additionally support wired communication. As such, for example, the communication interface 1406 may include a communication modem and/or other hardware and/or software for supporting communication via cable, digital subscriber line (DSL), universal serial bus (USB) or other mechanisms. In some example aspects, the communication interface 1406 may be further configured to receive input from the input unit 1408 as well as send output to the output unit 1410.

The output unit 1410 acts as an interface between the user device 1400 and the external world, such as the user, for providing an output of the system 106. The output unit 1410 may comprise any of: a speaker for generating a voice-based output or a display for generating a visual display. The display may include an LED display, an AMOLED display, a plasma display, an LCD display, and the like. The display may be configured to render a UI which may be in the form of UI components or interactive avatars like the male avatar 1410a or the female avatar 1410b. The interactive avatar acts as a concierge service of the user of the user device 1400 an provides a personalized assistant for carrying out user's day-to-day functions, such as shopping assistance, route assistance, payment assistance, social distancing assistance, reminders for important scheduled tasks, and the like.

The various modules, sub-modules, and their associated functionalities may be implemented by the user device 1400 by installing an app configured as the system 106, on the user device 1400, to carry out various functionalities discussed above, for providing enhanced user experience to the user of the user device 1400. Additionally, the various methods described in conjunction with FIG. 15-FIG. 17 may be used to carry out the various functionalities.

Figure 15:
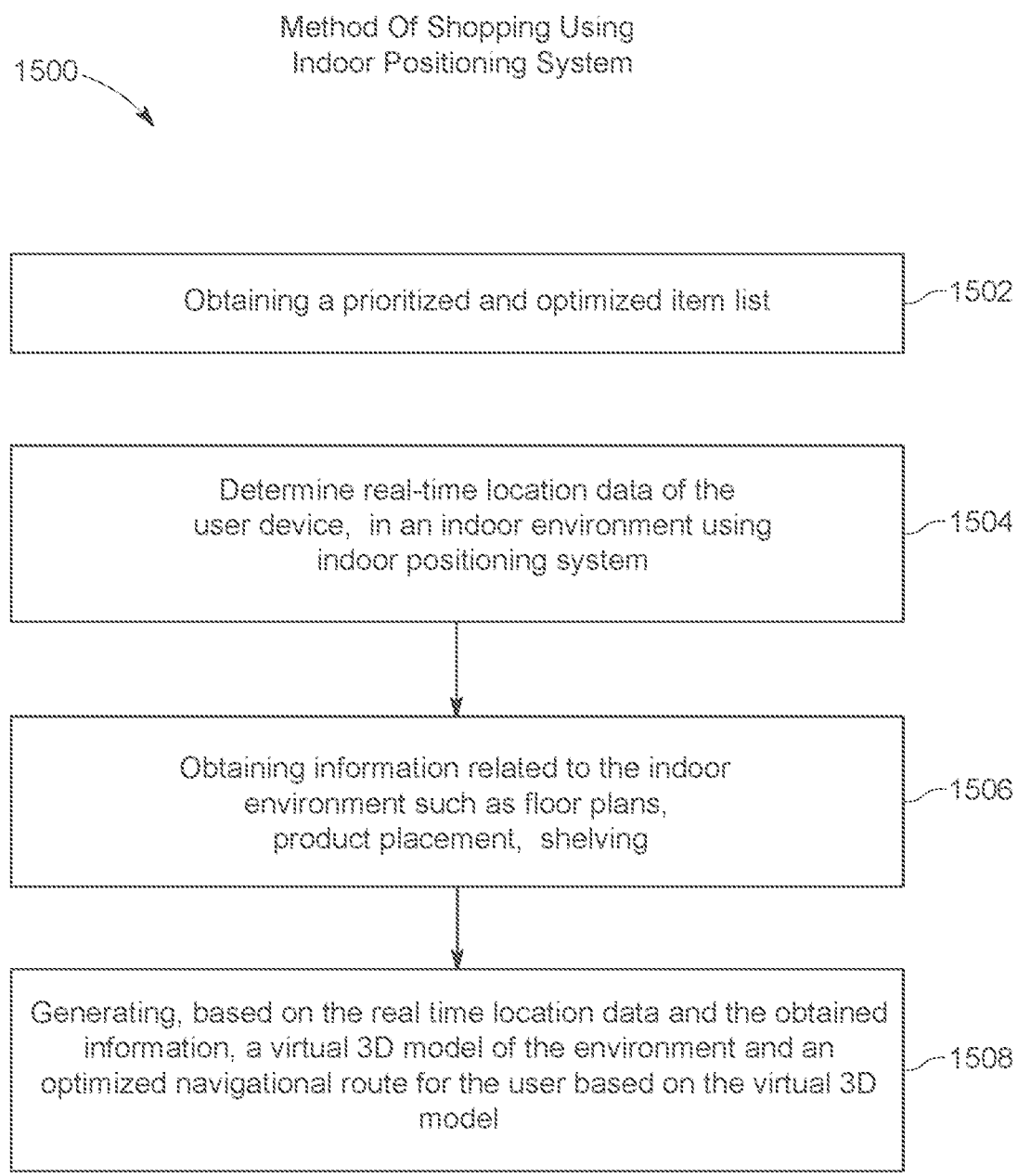
FIG. 15 shows a flowchart of an exemplary method of the system of FIGS. 2A-B, in accordance with an example embodiment of the present disclosure.

FIG. 15 shows a flowchart of an exemplary method 1500 implemented by the system 106 for providing enhanced user experience, in accordance with an example embodiment of the present disclosure. The method 1500 is executed by the processor 1404 of the user device 1400 in accordance with an example embodiment.

In one example, the method 1500 may be implemented in an indoor environment related to shopping. In another embodiment, the method may be implemented in any other indoor environment such as a hospital, a library, an airport, a conference, and the like, without deviating from the scope of the present disclosure.

At step 1502, the method 1500 includes creating a prioritized and optimized item list. The prioritized and optimized item list may be created based on a preliminary item list created by various inputs by the user/or by other means, such as text, speech, images, IoT inputs, computer vision and machine learning based detection and the like. Such prioritized and optimized item list creation has already been explained in conjunction with FIGS. 2A-2B and FIG. 7, FIG. 8, FIG. 9, and FIG. 10 earlier.

Once the shopping list is created in this manner, the method 1500 further comprises, at 1504, determining real-time location data of the user device (such as the user device 102a), in an indoor environment (such as the indoor environment 400), using an indoor positioning system (such as the indoor positioning system 110). As explained in FIGS. 2A-2B, and FIG. 4-FIG. 6, the determination is made based on location tracking of each user device 102a which is identifiable by their MAC address. Further, the indoor positioning infrastructure 110 comprising leaky feeder cable network 110a and Wi-Fi access points 110b is used to track the user device through triangulation and ToF measurements.

Further, the method 1500 comprises, at 1506, obtaining information related to the indoor environment 400, wherein the information may comprise such as floor plan information, shelving information, product placement information, inventory status information, facilities information, item return information and the like. For example, the floor management module 210 may be used to provide information about the floor plans and shelving system, which may further be accessed via API calls to the service provider's database 102b1.

Once such flooring and related information is obtained, the method 1500 further comprises, at 1508, generating the virtual 3D model of the indoor environment 400 and providing an optimized route for navigation on the generated virtual 3D model.

As already disclosed in FIGS. 2A-2B, and FIG. 4-FIG. 6, the virtual 3D model may comprise information about the intricacies of the indoor environment 400. For example, in case of retail store, the virtual 3D model may comprise the entire floor plan (or multiple floor plans) such as location of doors, passages, staircase, various objects (furniture), restrooms etc. The virtual 3D model is outputted based on the obtained real-time location of the user device 102a and mapping it to the floor on which the user is, and then further using the floor management module 210 to provide data for generating the virtual 3D model. Such virtual 3D model may also comprise the optimized navigational route presented to the user. Such a presentation of the optimized navigational route in collaboration with the virtual 3D model may be seen by the user and subsequently the user optimizes his/her navigation throughout the indoor environment 400 for availing enhanced user experience provided by the system 106 in this manner.

Further, in some aspects, a plurality of users may be present inside the indoor environment 400, with each user having their own associated user device 102a. Further, each user may have their own unique location related to the floor they are on, the facility they are using, the service or action they are performing and the like. The system 106, through the method 1500 may be configured to provide each user with a different virtual 3D model in their user device 102*a* according to his/her location. Further, the system 106 may be configured to display to each user, the optimized route based on the item list desired by the user and/or the real-time location of their user device 102*a*.

In some aspects, the method 1500 may be implemented in a hospital indoor environment. The hospital indoor environment may have different rooms like laboratory, ICU, ophthalmology department, emergency, and the like. A user, such as a patient may be visiting the hospital for performing some tasks, which form items in a list of tasks. For example, the tasks may include visiting a specialist doctor as per appointment, collecting lab reports, submitting, and paying bills for medical services availed, visiting a relative admitted in the hospital and the like. Once the user enters the hospital, the method 1500 may be performed to re-arrange the tasks based on a prioritization criteria (such as based on time of appointment and present time, the task of vising the specialist doctor may be prioritized over other tasks). Further, the user's location and information of the hospital indoor environment may be used to provide best possible route to the user from their current location to the room where the specialist doctor sits. The route may be displayed on a 3D-virtual model of the hospital displayed to the patient.

In a similar manner, the method 1500 may be implemented in any other indoor environment, without deviating from the scope of the present disclosure.

In some aspects, the item list may correspond to a shopping list, when the user in a retail store.

Figure 16:
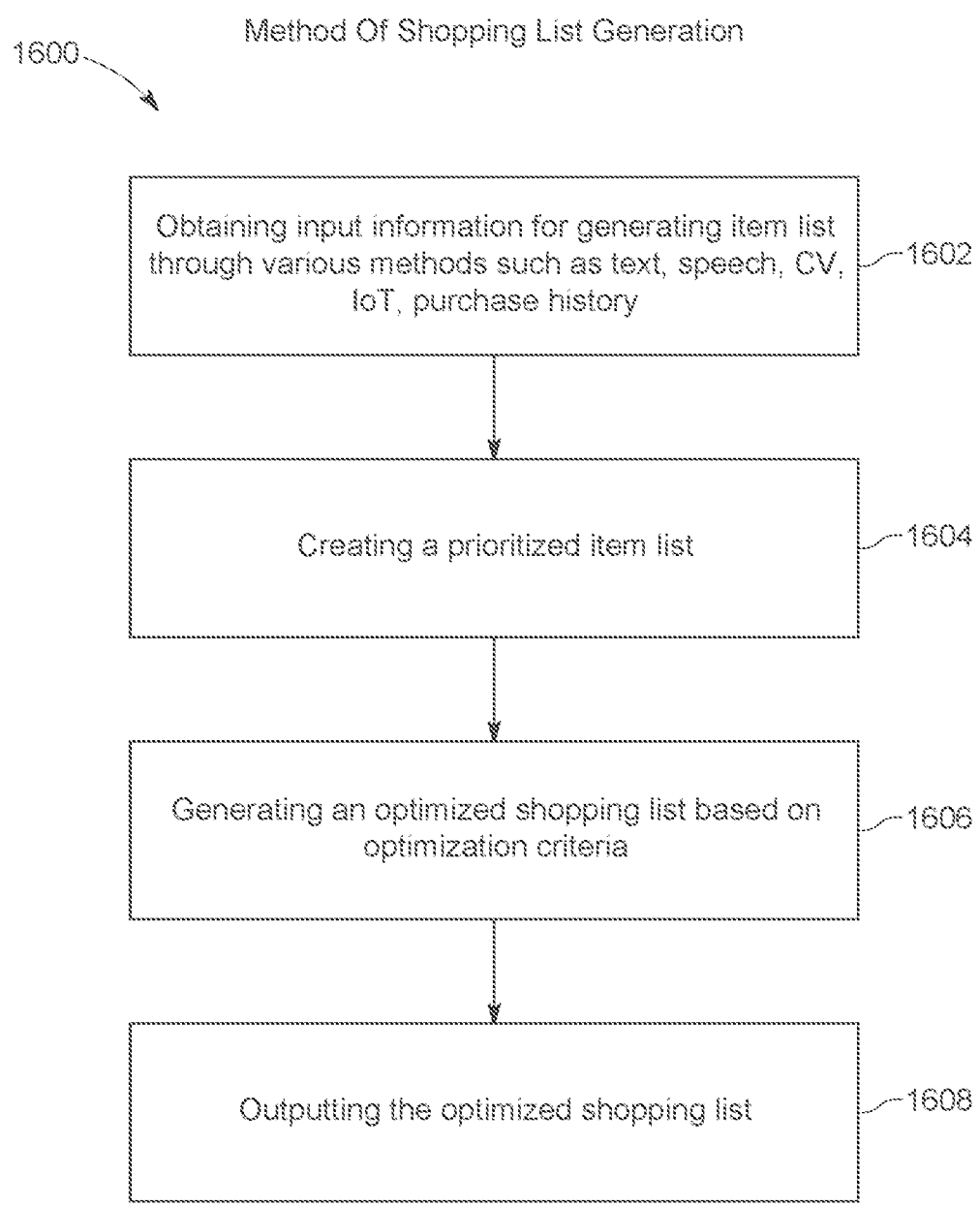
FIG. 16 shows a flowchart of an exemplary method for shopping list generation by the system of FIG. 2A-B, in accordance with an example embodiment of the present disclosure.

FIG. 16 shows a flowchart of an exemplary method 1600 for shopping list generation and optimization by the system 106, using the shopping list module 208 and the optimization module 218, according to an example embodiment of the present disclosure.

The method 1600 may comprise, at 1602, obtaining input information for generating an item list of the user. The input information may include such as information about things to shop, shopping budget, number of stores that user wants to visit, any distance limit that the user wants to set, and the like. Further, the input may be obtained in any of the forms such as text-based input, speech input, image input, IoT based input, interactive avatar-based input, and the like. The I/O module 202 enables obtaining of the user input in any manner described above, and further sends it to the shopping list module 208 for further processing.

At 1604, the obtained input is then used for creating a prioritized item list for the user. The prioritization may be done based on one or more criteria specified by the user at the time of providing the input. Further, the prioritization may be performed by the shopping list module 208 by using the functionalities of the AI/ML module 214, the analytics module 216, and the optimization module 218, as already explained in FIG. 7-FIG. 9, and FIG. 13. The prioritized shopping list may contain a prioritized order of items based on input data, and user history analysis. For example, from historical user data stored in the historical data module 208*a*1 of the shopping list module 208, the system 106 may identify that the user always shops for milk when they go out for grocery shopping. Thus, the shopping list module 208 is then configured to rearranger the order of items in the shopping list of the user, and places milk on the top.

Further, at 1606, the shopping list is optimized based on one or more optimization criteria specified by the user. For example, the user may specify that they want to travel only within a 3-mile radius from their home, for shopping. Then, the optimization module 218 may be configured to identify this criteria and use advanced analytics and AI/ML capabilities provided by the analytics module 216 and the AI/ML module 214 respectively, to optimize the shopping list of the user to include only those items that are available in stores within 3-mile radius from the user's home.

Once the optimization is done, at 1608, the prioritized and optimized shopping list may be output to the user such as using any output technology like displaying on a UI, speech output, avatar-based output, and the like, on their user device 102*a*.

The prioritization and optimization may be done iteratively in real-time, based on real-time constraints and automatic updates in criteria for optimization and prioritization. This may be done by self-learning implemented in the AI/ML module 214, which enables continuous real-time monitoring, tracking, updating, and outputting of prioritized and optimized shopping list to the user.

Thus, the system 106 is configured to provide enhanced user experiences by providing intelligent, contextual, real-time, and iterative user assistance in their daily life experiences, such as shopping, indoor navigation, travel needs, and the like.

Figure 17:
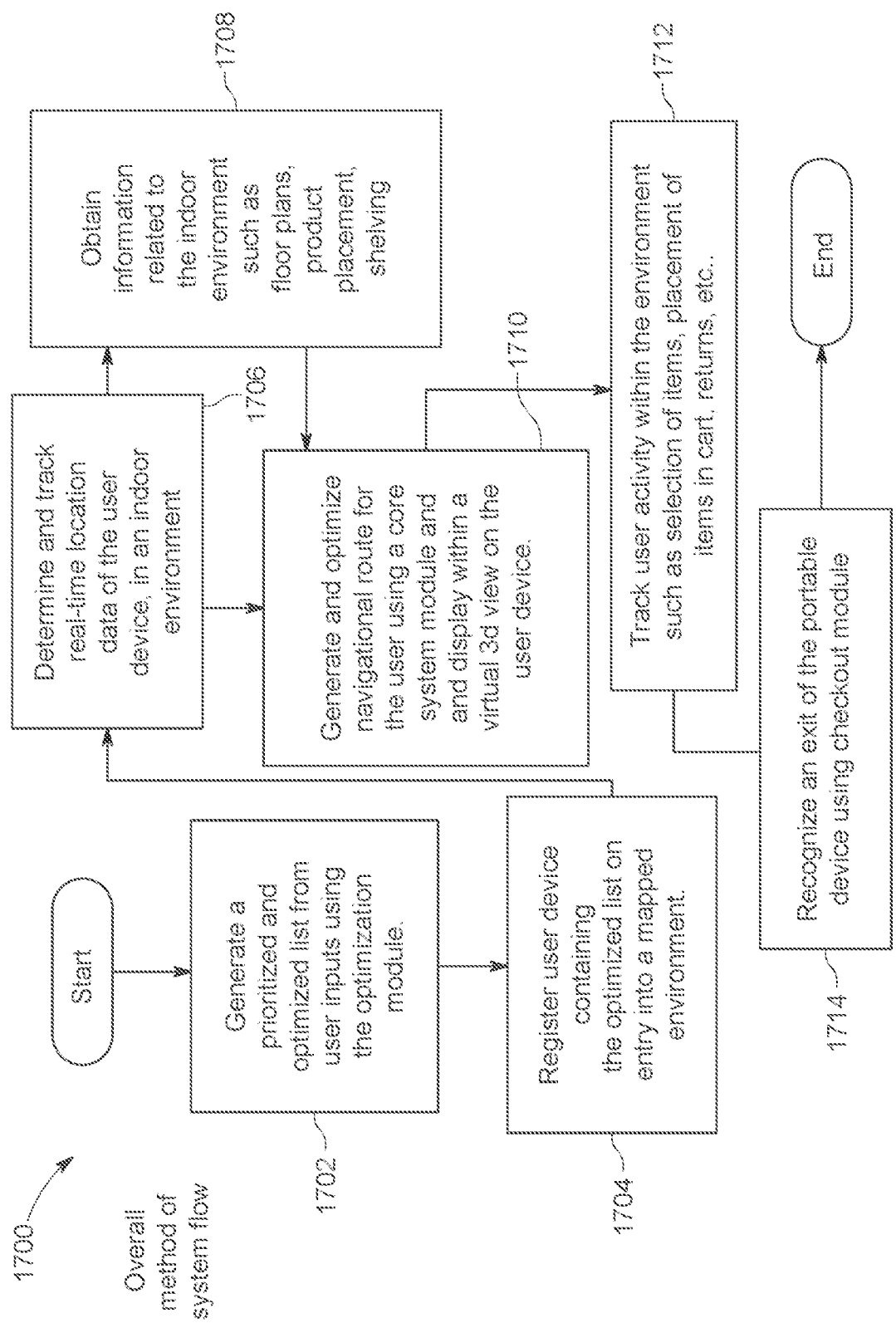
FIG. 17 shows a flowchart of another exemplary method flow for the system of FIGS. 2A-B, in accordance with an example embodiment of the present disclosure.

FIG. 17 illustrates a flowchart of another exemplary method 1700 for the system 106 for providing enhanced user experience, in accordance with an example embodiment of the present disclosure.

The method 1700 comprises, in 1702, generating a prioritized and optimized list based on obtained user inputs. For example, the system 106 generates an optimized and prioritized shopping list for the user based on the method 1600 described in FIG. 16.

Further, the method 1700 includes, at 1704, registering the user device containing the prioritized and optimized shopping list on entry into a mapped indoor environment. For example, this includes detecting the user device 102*a*, as it enters the indoor environment 400 for and is detected by the entry point detection module 204*a* of the indoor positioning module 204 associated with the indoor environment 400. At this point, the entry point detection module 204*a* uniquely identifies the user device 102*a* by their MAC address, which is then used for further tracking of the user device 102*a* throughout the indoor environment 400.

Further, the method 1700 includes, at 1706, determining and tracking the real-time location data of the user device 102*a* in the indoor environment 400. For example, using the combination of the capabilities of the indoor positioning module 204 and the indoor positioning infrastructure 110 described in FIG. 4, real-time location of the user carrying the user device 102*a* within the indoor environment 400 is tracked.

Also, the method 1700 comprises, at 1708, obtaining information related to the indoor environment 400, wherein such information includes floor plan information, product placement information, shelving information, and the like, which may be obtained from the floor management module 210. This information is then used further, at 1710, to generate and optimize a navigational route for the user. The optimized route may be generated such as by the routing module 204*e* of the indoor positioning module 400, and further may be displayed on the virtual 3D model of the indoor environment 400 displayed on the user's device 102*a*, as already described earlier.

Additionally, the method 1700 includes, at 1712, continuously tracking user's activity within the indoor environment 400. This may be done such by using user's location as identified by the indoor positioning module, use's image or video tracking using cameras and sensors deployed at various locations within the indoor environment 400, and the like. The information about the user that is tracked may include such as user's shopping, user's selection of items, placement of items in user's cart, returns tracking, and the like.

Once the user has fulfilled their needs in the indoor environment 400, at 1714, the user's exit from the indoor environment 400 is tracked using their device 102a, the entry/exit module 110c (or 204a) of the indoor positioning infrastructure 110, and the checkout module 212. The checkout module 212 may be associated with its corresponding hardware, such as a kiosk, a POS counter, a physical checkout device, a sensor at the exit gate, and the like.

Thus, overall, the user may be able to avail a seam-less and enhanced shopping experience using the methods described in FIGS. 15-17 and using the capabilities of the system 106 in various aspects described above.

According to some aspects, each of the methods 1500-1700 may be embodied in the form of computer programs, having computer-executable instructions, for each of the steps of each of the methods 1500-1700. Further, the aforesaid computer-executable instructions may be stored in a memory, such as the memory 1402 illustrated in FIG. 14 (or the memory 200b illustrated in FIG. 2A) for execution of the computer-executable instructions by a processor (such as the processor 200a illustrated in FIG. 2A or equivalently the processor 1404 illustrated in FIG. 14) which may be configured for providing enhanced user experience in the indoor environment 400 in accordance with the various aspects of the system 106 described in preceding paragraphs.

Such a system 106 provides technical improvements in terms of optimization of time, cost and decision making of the user, and further reduces the stress of the user by providing a stress free, intuitive, seam-less, and quick navigational indication on their user device 102a, in the form of an interactive display and accurate 3D model of the indoor environment 400.

The methods and systems disclosed herein are advantageous for people who want to save time and cost and improve user experience while visiting any kind of indoor environment. For example, at a retail store, the user can quickly collect items according to the prioritized and optimized item list. The user can quickly navigate through the indoor environment collecting the items according to the prioritized and optimized item list. While navigation, the user avoids clusters of traffic, and thus, quick navigation is enhanced with a stress-free navigation, and the user can happily spend more time with his/her family. Thus, the time and cost are optimized while also increasing the user experience in the indoor location.

The various aspects disclosed above also provide systems and methods that help in improving users' responsiveness, decision making, and daily transactional incidents using an easier-to-use, intuitive, and more engaging user interface (such as using virtual 3D map, turn-by-turn instructions, and customized avatars). Further, as all the data about user preferences is stored on user device only, thus, the overall system is secure, safe, and provides efficient business and social experience (in terms of time & cost saving) for any busy consumer of today, be it an urban or suburban 40 year-old mom that is active, tech savvy and wants to save time and money for herself and her family, or a young executive who likes to do all the things on-the-go for achieving multi-tasking.

The systems and methods disclosed herein are easily adaptable and advantageous to any kind of user, whether it an individual or a B2B or B2B2C consumer, in one of the various target segments including but not limited to: (a) medical/clinical and any healthcare professionals in hospital or healthcare settings, (b) facilities management professionals working in commercial or government buildings, (c) tourists and travelers, and (d) high school and college students that live and attend classes on school campus, as well as € day-to-day users like urban moms.

The various methods and systems disclosed above provide a scalable and modular architecture and framework for software development, in which separate modules are implemented for each specific functionality, thereby providing a scalable system. Further, each of the different modules can be aligned to each type of user: such as type or service provider, to better align with the user's products and its services with specific focus on the user-specific industries or environments.

Many modifications and other aspects of the inventions set forth herein will come to mind of one skilled in the art to which these inventions pertain having the benefit of the teachings presented in the foregoing descriptions and the associated drawing. Therefore, it is to be understood that the inventions are not to be limited to the specific embodiments disclosed and that modifications and other embodiments are intended to be included within the scope of the present disclosure. Moreover, although the foregoing descriptions and the associated drawing describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the present disclosure. Although specific terms are employed herein, they are used in a generic and descriptive sense only and not for purposes of limitation.

What is claimed is:

1. A method by a system device for providing an enhanced user experience in an indoor environment, the method comprising:

receiving, by the system device and based on at least one optimization criterion, shopping data associated with a user, wherein the at least one optimization criterion includes at least one of a distance criterion, a budget criterion, and a social distancing criterion;

generating, by the system device and based on the shopping data associated with the user, an item list comprising one or more items arranged in an order based on at least one priority criterion, the at least one optimization criterion, or a combination thereof;

determining, by the system device, real-time location data of a user device, associated with the user, in the indoor environment;

obtaining, by the system device and based on the real-time location data, indoor mapping and floor plan information collected by a drone and associated with the indoor environment;

generating, based on the indoor mapping and floor plan information collected by the drone, a virtual 3D model of the indoor environment;

generating, based on the real-time location data of the user device, the item list, and the virtual 3D model of the indoor environment, navigational data; and outputting, by the system device and to a user interface of the user device, the virtual 3D model of the indoor environment and the navigational data.

2. The method of claim 1, wherein generating the navigational data comprises:
generating an optimized navigational shopping route on the virtual 3D model of the indoor environment.

3. The method of claim 1, wherein receiving the shopping data associated with the user comprises one or more of:
receiving a user input comprising the one or more items;
obtaining historical user shopping data associated with the user; and
obtaining user shopping preference data associated with the user.

4. The method of claim 1, further comprising:
obtaining, based on the real-time location data and from a database, additional information associated with the indoor environment, wherein the additional information associated with the indoor environment comprises at least one of: facilities information, inventory status information, and item return information.

5. The method of claim 1, wherein outputting the virtual 3D model of the indoor environment comprises:
accessing, from a service provider database and via one or more application programming interface (API) calls, a pre-configured and dynamically updated map of the indoor environment; and
outputting the pre-configured and dynamically updated map of the indoor environment as the virtual 3D model of the indoor environment.

6. The method of claim 1, further comprising:
detecting, using one or more sensor devices, the user device upon entry into the indoor environment; and
assigning, based on detection of the user device upon entry into the indoor environment, an identifier to the user device, wherein determining the real-time location data of the user device comprises:
identifying position data of the user device in the indoor environment based on time of flight (ToF) data and triangulation data associated with the user device; and
determining, based on processing the identifier and the position data of the user device, the real-time location data of the user device.

7. The method of claim 6, wherein the position data of the user device is identified using one or more of a leaky feeder cable network and one or more Wi-Fi access points.

8. An indoor positioning system, comprising:
memory storing computer-executable instructions; and
at least one processor coupled with the memory and configured to execute the instructions to:
receive, based on at least one optimization criterion, shopping data associated with a user, wherein the at least one optimization criterion includes at least one of a distance criterion, a budget criterion, and a social distancing criterion;
generate, based on the shopping data associated with the user, an item list comprising one or more items arranged in an order based on at least one priority criterion, the at least one optimization criterion, or a combination thereof;
determine real-time location data of a user device, associated with the user, in an indoor environment;
obtain, based on the real-time location data, indoor mapping and floor plan information collected by a drone and associated with the indoor environment;
generate, based on the indoor mapping and floor plan information collected by the drone, a virtual 3D model of the indoor environment;
generate, based on the real-time location data of the user device, the item list, and the virtual 3D model of the indoor environment, navigational data; and
output, to a user interface of the user device, the virtual 3D model of the indoor environment and the navigational data.

9. The indoor positioning system of claim 8, wherein, to generate the navigational data, the at least one processor is further configured to execute the instructions to:
generate an optimized navigational shopping route on the virtual 3D model of the indoor environment.

10. The indoor positioning system of claim 8, wherein, to receive the shopping data associated with the user, the at least one processor is further configured to execute the instructions to:
receive a user input comprising the one or more items;
obtain historical user shopping data associated with the user; and
obtain user shopping preference data associated with the user.

11. The indoor positioning system of claim 8, wherein the at least one processor is further configured to execute the instructions to:
obtain, based on the real-time location data and from a database, additional information associated with the indoor environment, wherein the additional information comprises at least one of: facilities information, inventory status information, and item return information.

12. The indoor positioning system of claim 8, further comprising:
a transmission infrastructure comprising a network of leaky feeder cables;
a position detection infrastructure comprising a plurality of Wi-Fi access points and configured to detect a position of at least one user device; and
an output unit configured to output the detected position of the at least one user device.

13. The indoor positioning system of claim 8, wherein, to output the virtual 3D model of the indoor environment, the at least one processor is further configured to execute the instructions to:
access, from a service provider database and via one or more application programming interface (API) calls, a pre-configured and dynamically updated map of the indoor environment; and
output the pre-configured and dynamically updated map of the indoor environment as the virtual 3D model of the indoor environment.

14. The indoor positioning system of claim 8, wherein the at least one processor is further configured to execute the instructions to:
detect, using one or more sensor devices, the user device upon entry into the indoor environment; and
assign, based on detection of the user device upon entry into the indoor environment, an identifier to the user device, and
wherein, to determine the real-time location data of the user device, the at least one processor is further configured to execute the instructions to:
identify position data of the user device in the indoor environment based on time of flight (ToF) data and triangulation data associated with the user device; and determine, based on processing the identifier and the position data of the user device, the real-time location data of the user device.

15. A non-transitory, computer-readable medium having stored thereon computer-executable instructions which, when executed by one or more processors, cause the one or more processors to perform:

receiving, based on at least one optimization criterion, shopping data associated with a user, wherein the at least one optimization criterion includes at least one of a distance criterion, a budget criterion, and a social distancing criterion;

generating, based on the shopping data associated with the user, an item list comprising one or more items arranged in an order based on at least one priority criterion, the at least one optimization criterion, or a combination thereof;

determining, real-time location data of a user device, associated with the user, in an indoor environment;

obtaining, based on the real-time location data, indoor mapping and floor plan information collected by a drone and associated with the indoor environment;

generating, based on the indoor mapping and floor plan information collected by the drone, a virtual 3D model of the indoor environment;

generating, based on the real-time location data of the user device, the item list, and the virtual 3D model of the indoor environment, navigational data; and outputting, to a user interface of the user device, the virtual 3D model of the indoor environment and the navigational data.

16. The non-transitory, computer-readable medium of claim 15, wherein generating the navigational data further comprises:

generating an optimized navigational shopping route on the virtual 3D model of the indoor environment.

17. The non-transitory, computer-readable medium of claim 15, wherein receiving the shopping data associated the user further comprises:

receiving a user input comprising the one or more items;

obtaining historical user shopping data associated with the user; and obtaining user shopping preference data associated with the user.

18. The non-transitory, computer-readable medium of claim 15, wherein the instructions further cause the one or more processors to perform:

obtaining, based on the real-time location data and from a database, additional information associated with the indoor environment, wherein the additional information associated with the indoor environment comprises at least one of: facilities information, inventory status information, and item return information.

19. The non-transitory, computer-readable medium of claim 15, wherein outputting the virtual 3D model of the indoor environment comprises:

accessing, from a service provider database and via one or more application programming interface (API) calls, a pre-configured and dynamically updated map of the indoor environment; and outputting the pre-configured and dynamically updated map of the indoor environment as the virtual 3D model of the indoor environment.

20. The non-transitory, computer-readable medium of claim 15, wherein the instructions further cause the one or more processors to perform:

detecting, using one or more sensor devices, the user device upon entry into the indoor environment; and assigning, based on detection of the user device upon entry into the indoor environment, an identifier to the user device, and wherein for determining the real-time location data of the user device, comprises:

identifying position data of the user device in the indoor environment based on time of flight (ToF) data and triangulation data associated with the user device; and determining, based on processing the identifier and the position data of the user device, the real-time location data of the user device.

* * * * *